US010986666B2

(12) United States Patent
Vajapeyam et al.

(10) Patent No.: US 10,986,666 B2
(45) Date of Patent: Apr. 20, 2021

(54) RANDOM ACCESS PROCEDURE ENHANCEMENTS FOR HETEROGENEOUS NETWORKS

(71) Applicant: QUALCOMM Incorporated, San Diego, CA (US)

(72) Inventors: Madhavan Srinivasan Vajapeyam, San Diego, CA (US); Aleksandar Damnjanovic, Del Mar, CA (US); Tingfang Ji, San Diego, CA (US); Osok Song, San Diego, CA (US); Tao Luo, San Diego, CA (US); Hao Xu, San Diego, CA (US); Yongbin Wei, San Diego, CA (US); Alan Barbieri, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/137,468

(22) Filed: Dec. 20, 2013

(65) Prior Publication Data

US 2014/0119320 A1 May 1, 2014

Related U.S. Application Data

(62) Division of application No. 13/085,372, filed on Apr. 12, 2011, now Pat. No. 8,666,398.

(Continued)

(51) Int. Cl.
*H04W 74/08* (2009.01)
*H04W 28/18* (2009.01)

(52) U.S. Cl.
CPC ........ *H04W 74/0833* (2013.01); *H04W 28/18* (2013.01)

(58) Field of Classification Search
CPC .......................... H04W 74/0833; H04W 28/18
(Continued)

(56) References Cited

U.S. PATENT DOCUMENTS

2005/0266846 A1  12/2005 Kim et al.
2006/0160544 A1*  7/2006 Sun ........................ H04W 76/14
                                                    455/456.1
(Continued)

FOREIGN PATENT DOCUMENTS

CN       101005308 A      7/2007
CN       101128024 A      2/2008
(Continued)

OTHER PUBLICATIONS

International Search Report and Written Opinion—PCT/US2011/032357, ISA/EPO—dated Sep. 2, 2011.
(Continued)

*Primary Examiner* — Huy D Vu
*Assistant Examiner* — Nizam Ahmed

(57) ABSTRACT

Certain aspects of the present disclosure provide various mechanisms that allow a user equipment to convey information regarding one or more attributes to a base station during a random access (RA) procedure. The attributes may include, for example a capability of the UE (e.g., to support a particular feature or version of a standard) or a condition of the UE (e.g., if it is currently experiencing an interference condition).

37 Claims, 16 Drawing Sheets

Related U.S. Application Data

(60) Provisional application No. 61/323,815, filed on Apr. 13, 2010, provisional application No. 61/394,268, filed on Oct. 18, 2010.

(58) Field of Classification Search
USPC .......................................................... 370/329
See application file for complete search history.

(56) References Cited

U.S. PATENT DOCUMENTS

| | | | | |
|---|---|---|---|---|
| 2008/0130588 | A1* | 6/2008 | Jeong | H04W 74/002 370/335 |
| 2008/0267126 | A1 | 10/2008 | Vujcic et al. | |
| 2009/0042582 | A1* | 2/2009 | Wang | H04W 74/0866 455/450 |
| 2009/0185600 | A1* | 7/2009 | Hethuin | H04B 1/713 375/133 |
| 2009/0186613 | A1* | 7/2009 | Ahn | H04L 5/003 455/434 |
| 2009/0221282 | A1* | 9/2009 | Lee | H04W 24/10 455/424 |
| 2009/0290550 | A1* | 11/2009 | Bhattad | H04W 72/0406 370/329 |
| 2010/0255847 | A1* | 10/2010 | Lee | H04W 52/50 455/436 |
| 2010/0309876 | A1* | 12/2010 | Khandekar | H04L 5/0037 370/330 |
| 2010/0311452 | A1 | 12/2010 | Li et al. | |
| 2010/0322096 | A1* | 12/2010 | Hsu | H04W 74/002 370/252 |
| 2011/0014922 | A1* | 1/2011 | Jen | H04W 74/002 455/450 |
| 2011/0075620 | A1 | 3/2011 | Jang et al. | |
| 2011/0086662 | A1* | 4/2011 | Fong | H04W 72/0406 455/517 |
| 2011/0090860 | A1* | 4/2011 | Ihm | H04J 11/0069 370/329 |
| 2011/0098046 | A1* | 4/2011 | Shin | H04W 48/16 455/436 |
| 2011/0105135 | A1* | 5/2011 | Krishnamurthy | H04W 16/10 455/450 |
| 2011/0250913 | A1 | 10/2011 | Vajapeyam et al. | |
| 2011/0287776 | A1* | 11/2011 | Vujcic | H04W 72/048 455/452.1 |
| 2012/0015659 | A1* | 1/2012 | Kalyani | H04W 24/08 455/436 |
| 2012/0134275 | A1* | 5/2012 | Choi | H04L 5/0057 370/241 |
| 2012/0147830 | A1* | 6/2012 | Lohr | H04L 1/1854 370/329 |
| 2012/0295610 | A1* | 11/2012 | Deng | H04W 24/10 455/423 |
| 2013/0003646 | A1* | 1/2013 | Michel | H04B 7/15592 370/315 |
| 2014/0362806 | A1* | 12/2014 | Liu | H04W 72/14 370/329 |

FOREIGN PATENT DOCUMENTS

| | | |
|---|---|---|
| CN | 101128025 A | 2/2008 |
| CN | 101128026 A | 2/2008 |
| CN | 101300755 A | 11/2008 |
| CN | 101409921 A | 4/2009 |
| CN | 101529754 A | 9/2009 |
| CN | 101534564 A | 9/2009 |
| EP | 1892972 A1 | 2/2008 |
| EP | 2265077 A1 | 12/2010 |
| WO | 2007052972 A1 | 5/2007 |
| WO | 2008153320 A1 | 12/2008 |
| WO | 2009064647 A1 | 5/2009 |
| WO | 2009078795 A1 | 6/2009 |
| WO | WO2009078795 A1 * | 6/2009 ............ H04W 72/14 |

OTHER PUBLICATIONS

LG Electronics: "Discussion on RACH enhancements", 3GPP TSG-RAN WG2 #59bis, R2-074165, Oct. 12, 2007.

NTT DOCOMO: "Interference Coordination for Non-CA-based Heterogeneous Networks", 3GPP Draft; R1-102307 ICIC for Non-CA HETNET, 3rd Generation Partnership Project (3GPP), Mobile Competence Centre; 650, Route Des Lucioles; F-06921 Sophia-Antipolis Cedex; France, vol. RAN WG1, No. Beijing, china; Apr. 12, 2010, Apr. 7, 2010 (Apr. 7, 2010), pp. 1-11, XP050419698, [retrieved on Apr. 7, 2010].

Qualcomm Incorporated: "Extending Rel-8/9 ICIC into Rel-10", 3GPP Draft; R1-101505 Extending Rel-8-9 ICIC Into Rel-10, 3rd Generation Partnership Project (3GPP), Mobile Competence Centre; 650, Route Des Lucioles ; F-06921 Sophia-Antipolis Cedex; France, vol. RAN WG1, No. San Francisco, USA; Feb. 22, 2010, Feb. 16, 2010 (Feb. 16, 2010), pp. 1-4, XP050418951, [retrieved on Feb. 16, 2010].

Taiwan Search Report—TW100112866—TIPO—dated May 5, 2013.

* cited by examiner

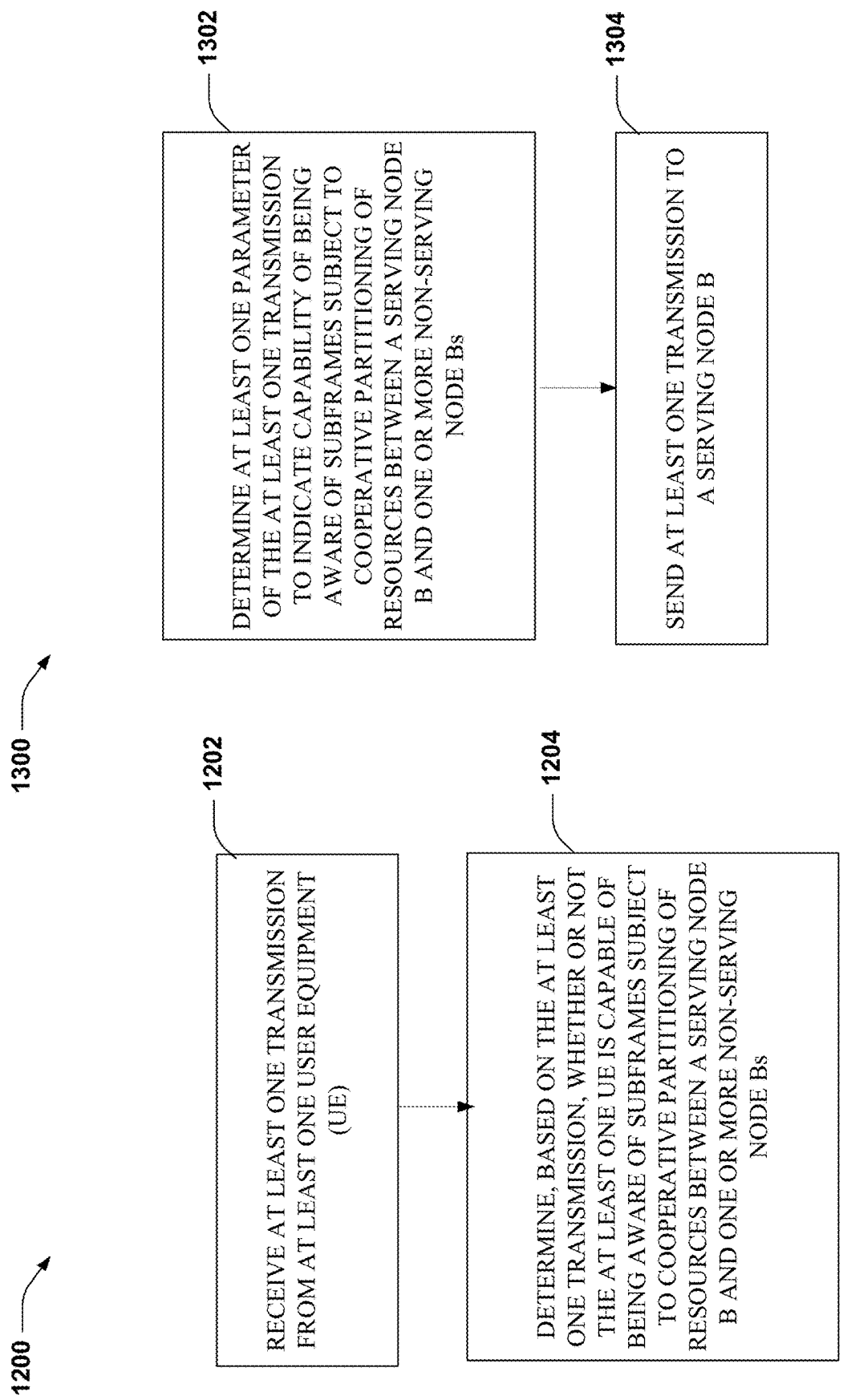

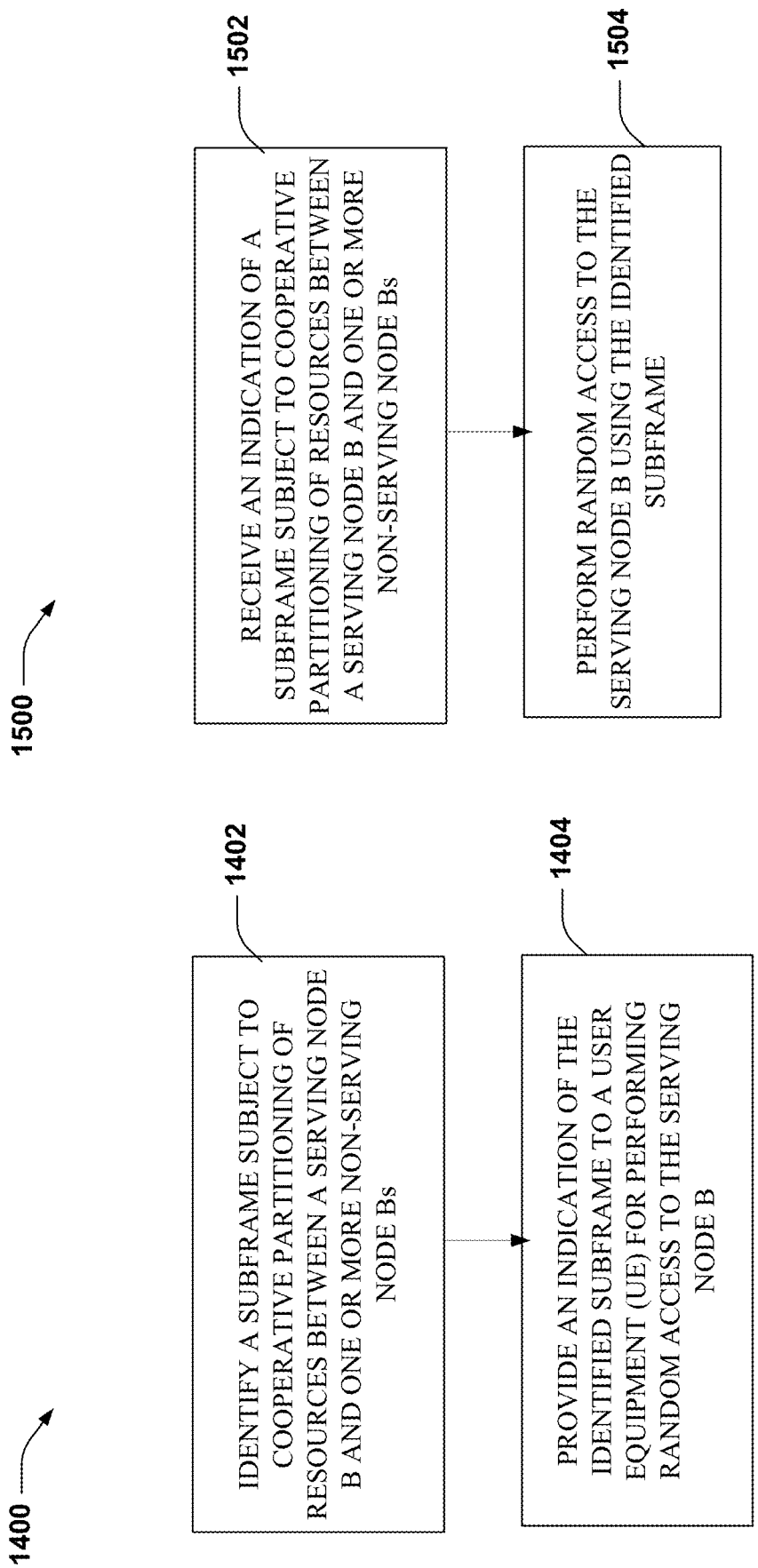

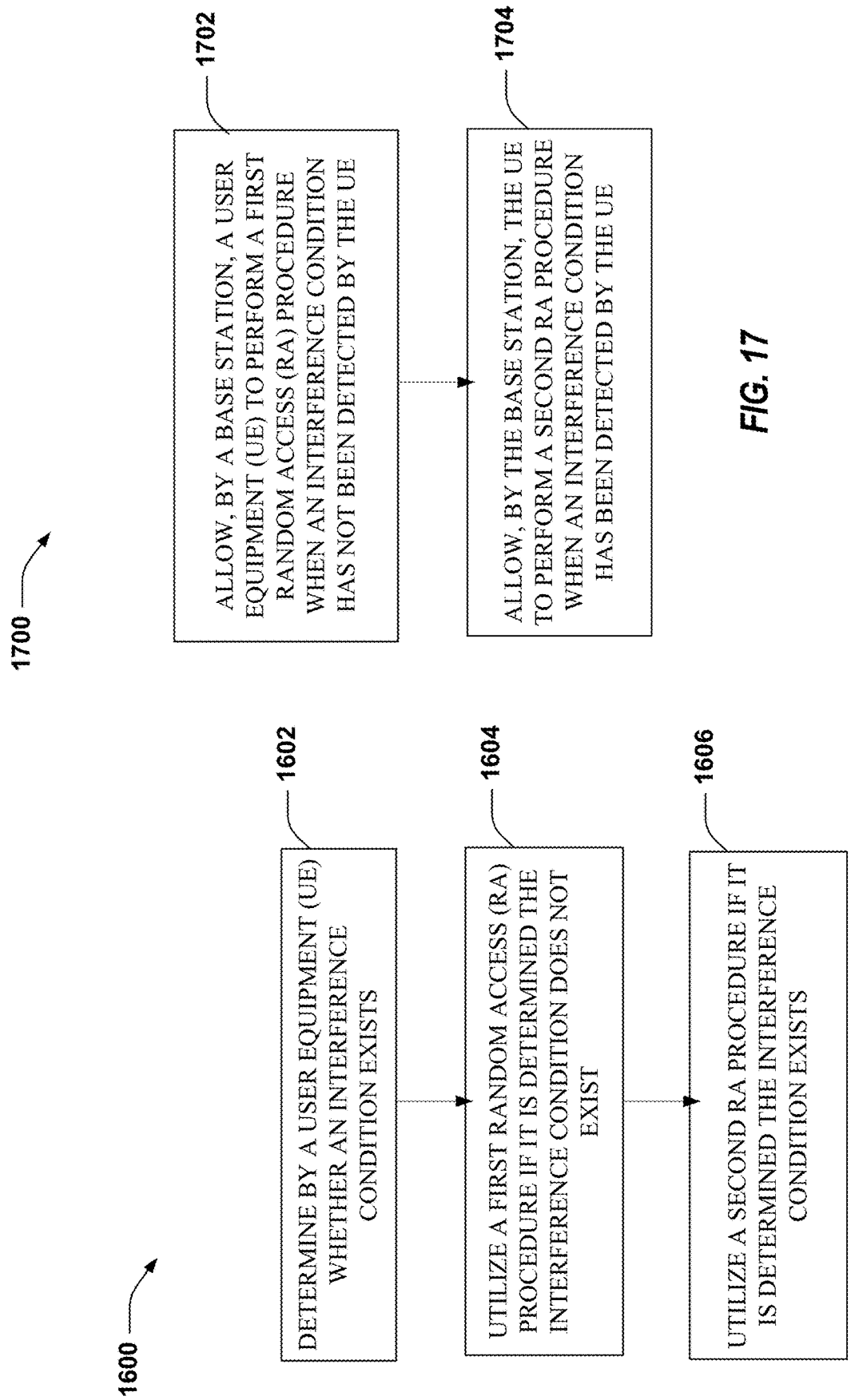

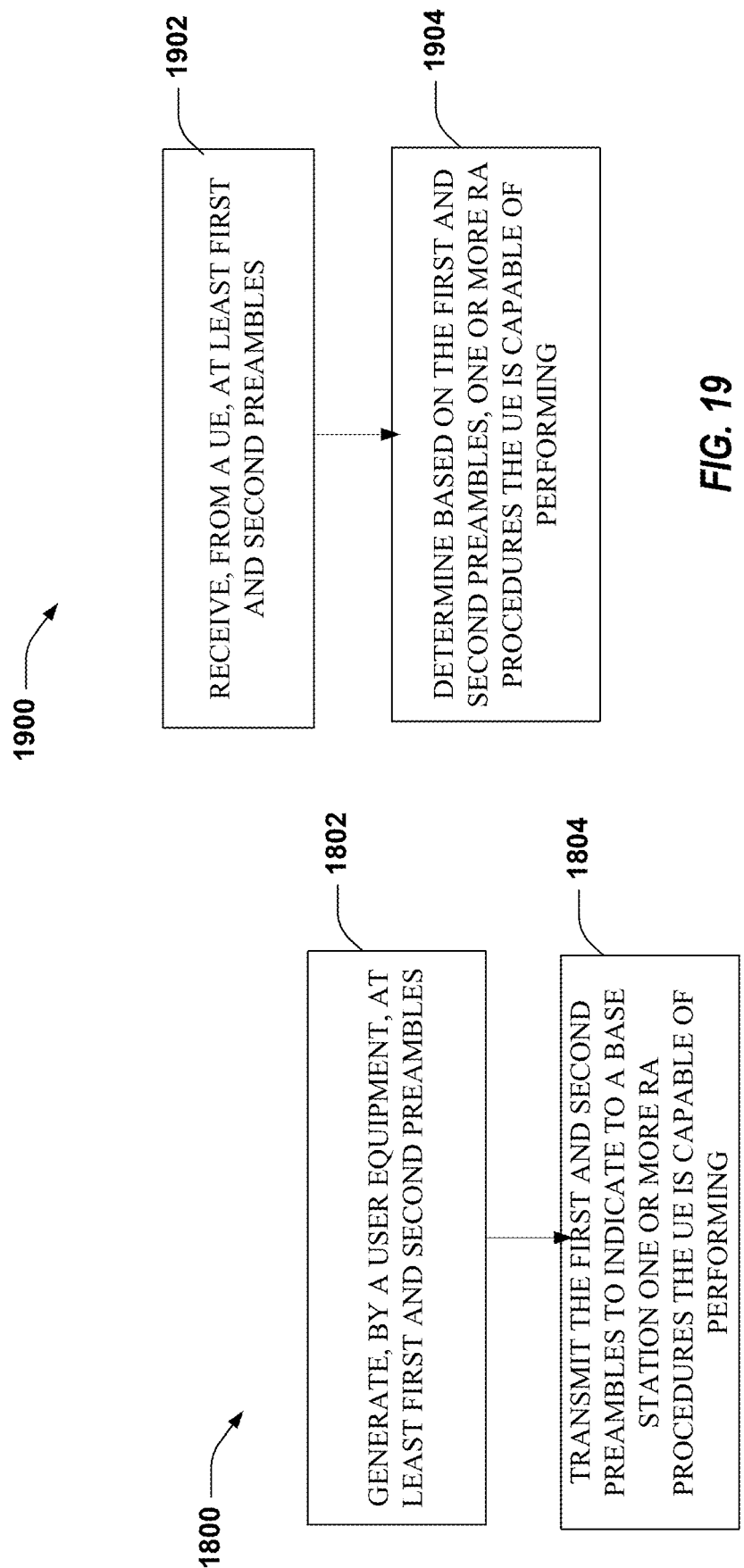

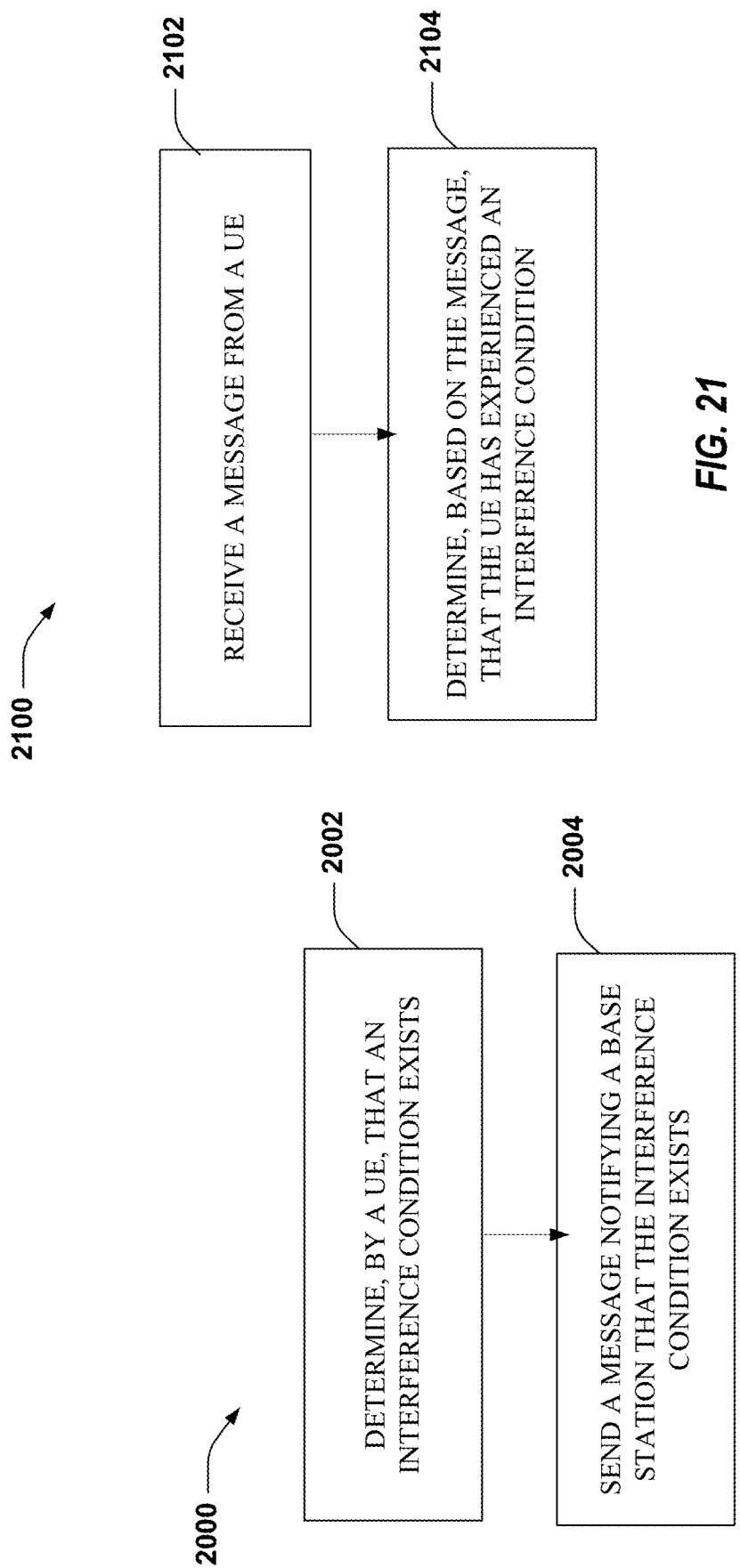

RANDOM ACCESS PROCEDURE ENHANCEMENTS FOR HETEROGENEOUS NETWORKS

CROSS-REFERENCE TO RELATED APPLICATIONS

This application is a divisional of U.S. Non Provisional application Ser. No. 13/085,372, entitled, "RANDOM ACCESS PROCEDURE ENHANCEMENTS FOR HETEROGENEOUS NETWORKS", filed on Apr. 12, 2011, and claims priority to U.S. Provisional Application Ser. No. 61/323,815, entitled, "RANDOM ACCESS PROCEDURE ENHANCEMENTS FOR HETEROGENEOUS NETWORKS", filed on Apr. 13, 2010, and to U.S. Provisional Application Ser. No. 61/394,268, entitled, "RANDOM ACCESS PROCEDURE ENHANCEMENTS FOR LTE HETEROGENEOUS NETWORKS", filed on Oct. 18, 2010, all of which are expressly incorporated by reference herein in their entirety.

BACKGROUND

1. Field

The present disclosure relates generally to communication, and more specifically to techniques for supporting communication in a wireless communication network.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from neighbor base stations. On the uplink, a transmission from the UE may cause interference to transmissions from other UEs communicating with the neighbor base stations. The interference may degrade performance on both the downlink and uplink.

SUMMARY

Certain aspects of the present disclosure provide a method for wireless communication. The method generally includes receiving, by a user equipment (UE) from a base station, configuration parameters for performing different random access (RA) procedures and notifying the base station of an attribute of the UE by transmitting one or more RA messages in accordance with one of the RA procedures, wherein the attribute is indicated by the RA procedure used.

Certain aspects of the present disclosure provide a method for wireless communication. The method generally includes configuring a user equipment (UE) with parameters for performing different random access (RA) procedures, receiving one or more RA messages sent in accordance with one of the RA procedures, and identifying an attribute of the UE based on the RA procedure used.

Certain aspects of the present disclosure provide a method for wireless communication. The method generally includes identifying one or more subframes subject to cooperative partitioning of resources between a serving Node B and one or more non-serving Node Bs and configuring a user equipment (UE) for performing a random access (RA) procedure utilizing the one or more subframes.

Certain aspects of the present disclosure provide an apparatus for wireless communication. The apparatus generally includes means for receiving, by a user equipment (UE) from a base station, configuration parameters for performing different random access (RA) procedures and means for notifying the base station of an attribute of the UE by transmitting one or more RA messages in accordance with one of the RA procedures, wherein the attribute is indicated by the RA procedure used.

Certain aspects of the present disclosure provide an apparatus for wireless communication. The apparatus generally includes means for configuring a user equipment (UE) with parameters for performing different random access (RA) procedures, means for receiving one or more RA messages sent in accordance with one of the RA procedures, and means for identifying an attribute of the UE based on the RA procedure used.

Certain aspects of the present disclosure provide an apparatus for wireless communication. The apparatus generally includes means for identifying one or more subframes subject to cooperative partitioning of resources between a serving Node B and one or more non-serving Node Bs and means for configuring a user equipment (UE) for performing a random access (RA) procedure utilizing the one or more subframes.

Certain aspects of the present disclosure provide an apparatus for wireless communication. The apparatus generally includes at least one processor configured to receive, by a user equipment (UE) from a base station, configuration parameters for performing different random access (RA) procedures and notify the base station of an attribute of the UE by transmitting one or more RA messages in accordance with one of the RA procedures, wherein the attribute is indicated by the RA procedure used.

Certain aspects of the present disclosure provide an apparatus for wireless communication. The apparatus generally includes at least one processor configured to configure a user equipment (UE) with parameters for performing different random access (RA) procedures, receive one or more RA messages sent in accordance with one of the RA procedures, and identify an attribute of the UE based on the RA procedure used.

Certain aspects of the present disclosure provide an apparatus for wireless communication. The apparatus generally includes at least one processor configured to identify one or more subframes subject to cooperative partitioning of resources between a serving Node B and one or more non-serving Node Bs and configure a user equipment (UE) for performing a random access (RA) procedure utilizing the one or more subframes.

Certain aspects of the present disclosure provide a computer program product comprising a computer readable medium with instructions stored thereon. The instructions are generally executable by one or more processors for receiving, by a user equipment (UE) from a base station, configuration parameters for performing different random access (RA) procedures and notifying the base station of an attribute of the UE by transmitting one or more RA messages in accordance with one of the RA procedures, wherein the attribute is indicated by the RA procedure used.

Certain aspects of the present disclosure provide a computer program product comprising a computer readable medium with instructions sthored thereon. The instructions are generally executable by one or more processors for configuring a user equipment (UE) with parameters for performing different random access (RA) procedures, receiving one or more RA messages sent in accordance with one of the RA procedures, and identifying an attribute of the UE based on the RA procedure used.

Certain aspects of the present disclosure provide a computer program product comprising a computer readable medium with instructions stored thereon. The instructions are generally executable by one or more processors for identifying one or more subframes subject to cooperative partitioning of resources between a serving Node B and one or more non-serving Node Bs and configuring a user equipment (UE) for performing a random access (RA) procedure utilizing the one or more subframes.

BRIEF DESCRIPTION OF THE DRAWINGS

FIG. 12 is a flow diagram illustrating example operations in accordance with an aspect of the present disclosure.

FIG. 13 is a flow diagram illustrating example operations in accordance with an aspect of the present disclosure.

FIG. 14 is a flow diagram illustrating example operations in accordance with an aspect of the present disclosure.

FIG. 15 is a flow diagram illustrating example operations in accordance with an aspect of the present disclosure.

FIG. 16 is a flow diagram illustrating example operations in accordance with an aspect of the present disclosure.

FIG. 17 is a flow diagram illustrating example operations in accordance with an aspect of the present disclosure.

FIG. 18 is a flow diagram illustrating example operations in accordance with an aspect of the present disclosure.

FIG. 19 is a flow diagram illustrating example operations in accordance with an aspect of the present disclosure.

FIG. 20 is a flow diagram illustrating example operations in accordance with an aspect of the present disclosure.

FIG. 21 is a flow diagram illustrating example operations in accordance with an aspect of the present disclosure.

DETAILED DESCRIPTION

Certain aspects of the present disclosure provide various mechanisms that allow a user equipment to convey information regarding one or more attributes to a base station during a random access (RA) procedure. The attributes may include, for example a capability of the UE (e.g., to support a particular feature or version of a standard) or a condition of the UE (e.g., if it is currently experiencing an interference condition).

Certain aspects of the present disclosure provide techniques for utilizing random access (RA) procedures performed by a user equipment (UE) to convey information regarding an attribute of the UE to a base station (BS). The BS may configure the UE with parameters for performing different types of RA procedures and a particular RA procedure used may indicate, to the BS, the attribute. For example, a UE may use one RA procedure when an interference condition is detected and a second RA procedure when the interference condition is not detected. As another example, a UE may indicate its capability by utilizing a particular RA procedure (e.g., one RA procedure may indicate, to the BS, the UE is has the capability to be aware of and use resource partitioning information).

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
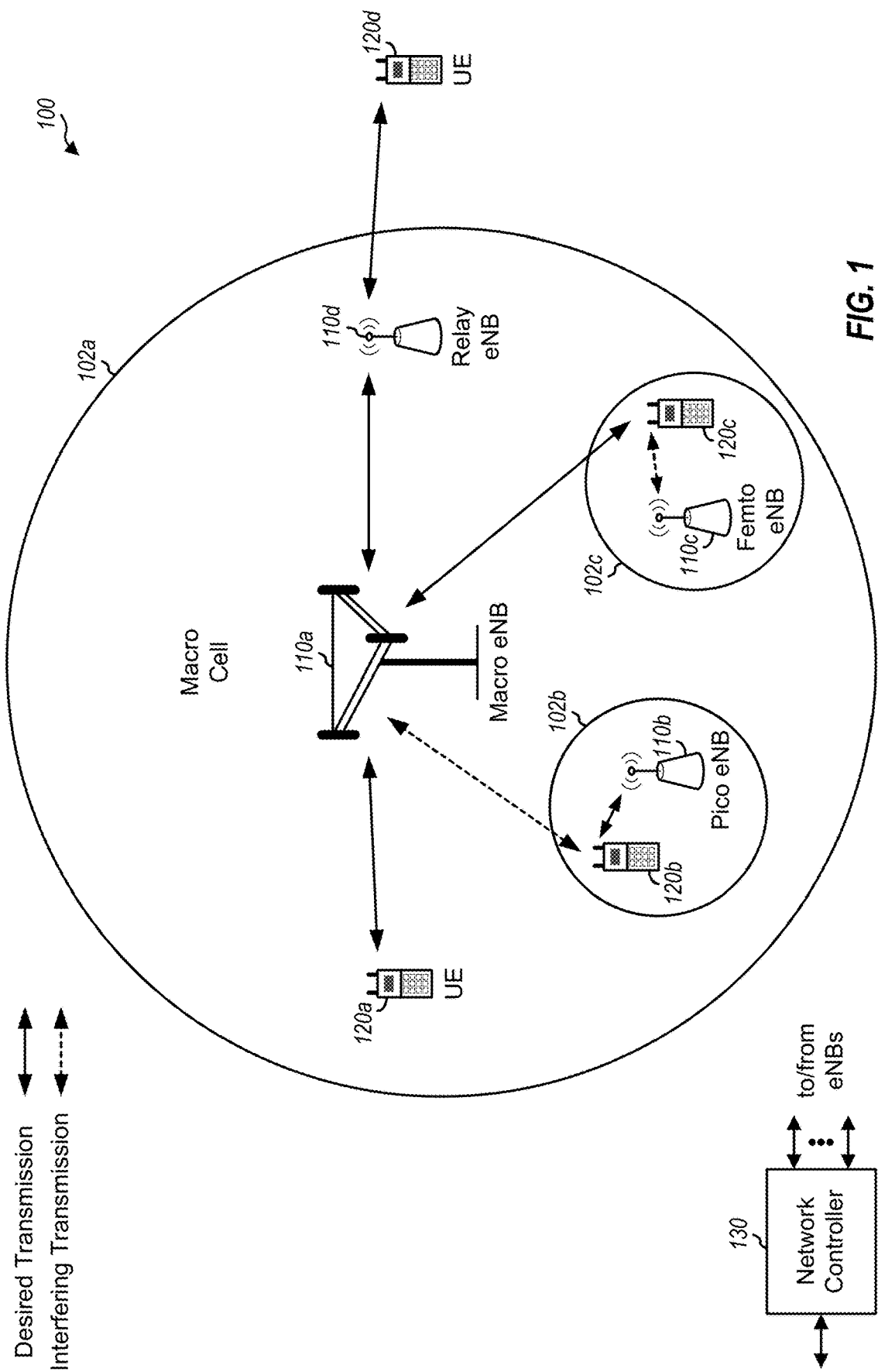
FIG. 1 is a block diagram conceptually illustrating an example of a wireless a communications network in accordance with certain aspects of the present disclosure.

FIG. 1 shows a wireless communication network 100 in which RA procedures described herein may be performed. The network 100 may be an LTE network or some other wireless network. Wireless network 100 may include a number of evolved Node Bs (eNBs) 110 and other network entities. An eNB is an entity that communicates with UEs and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

As will be described in greater detail below, according to certain aspects, eNBs may perform inter-cell interference coordination (ICIC). ICIC may involve negotiation between eNBs to achieve resource coordination/partitioning to allocate resources to an eNB located near the vicinity of a strong interfering eNB. The interfering eNB may avoid transmitting on the allocated/protected resources, possibly except for a CRS. A UE can then communicate with the eNB on the protected resources in the presence of the interfering eNB and may observe no interference (possibly except for the CRS) from the interfering eNB UEs 120 may be dispersed throughout wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

Figure 2:
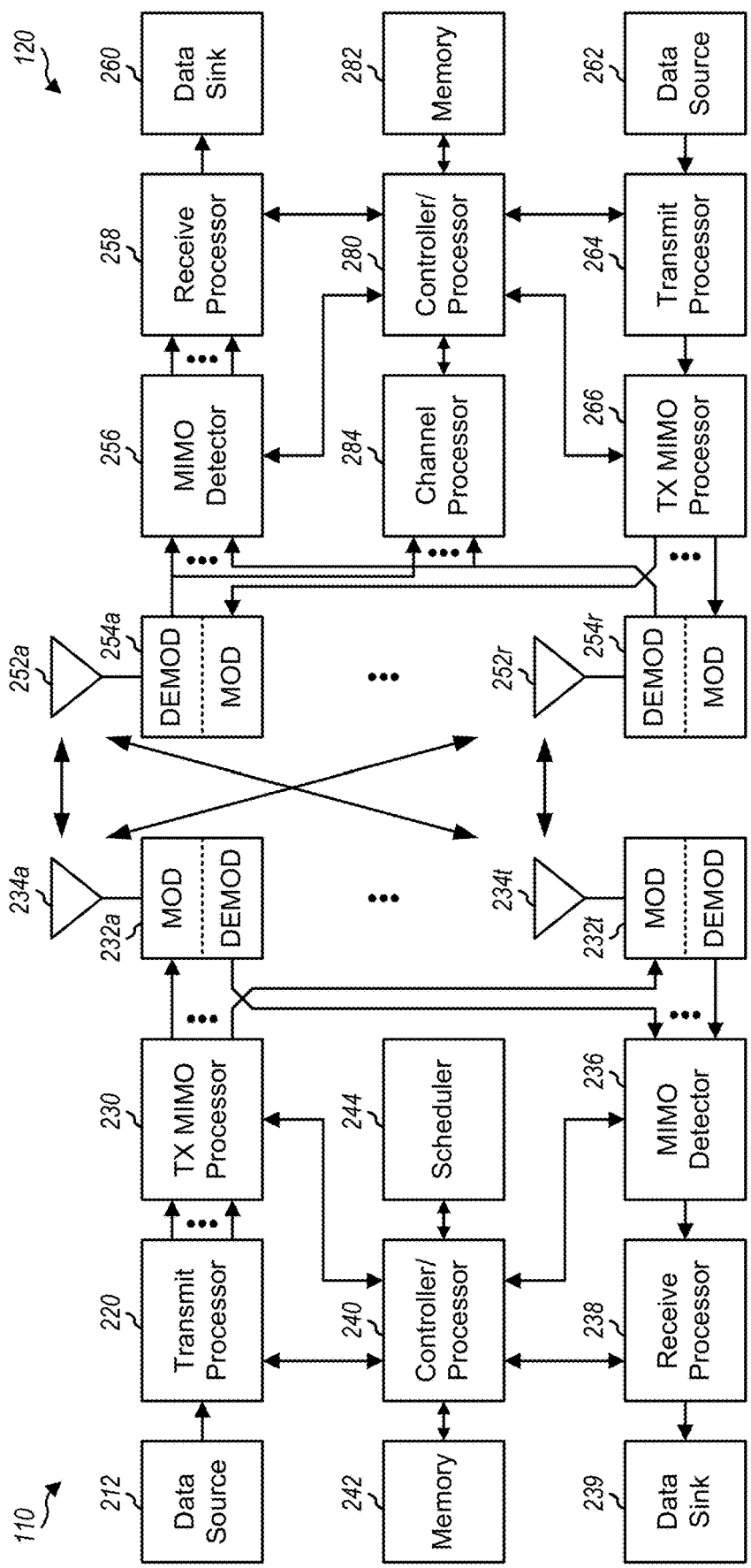
FIG. 2 is a block diagram of an example base station and an example user equipment (UE).

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor 284 may determine RSRP, RSSI, RSRQ, CQI, etc., as described below.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240.

Controllers/processors 240 and 280 may direct the operation at base station 110 and UE 120, respectively. Processor 240 and/or other processors and modules at base station 110 may perform or direct operations for configuring a UE for various random access procedures and identify one or more attributes during such procedures, as described herein. For example, processor 280 and/or other processors and modules at UE 120 may perform or direct operations for various random access procedure described herein. Memories 242 and 282 may store data and program codes for base station 110 and UE 120, respectively. A scheduler 244 may schedule UEs for data transmission on the downlink and/or uplink.

Figure 3:
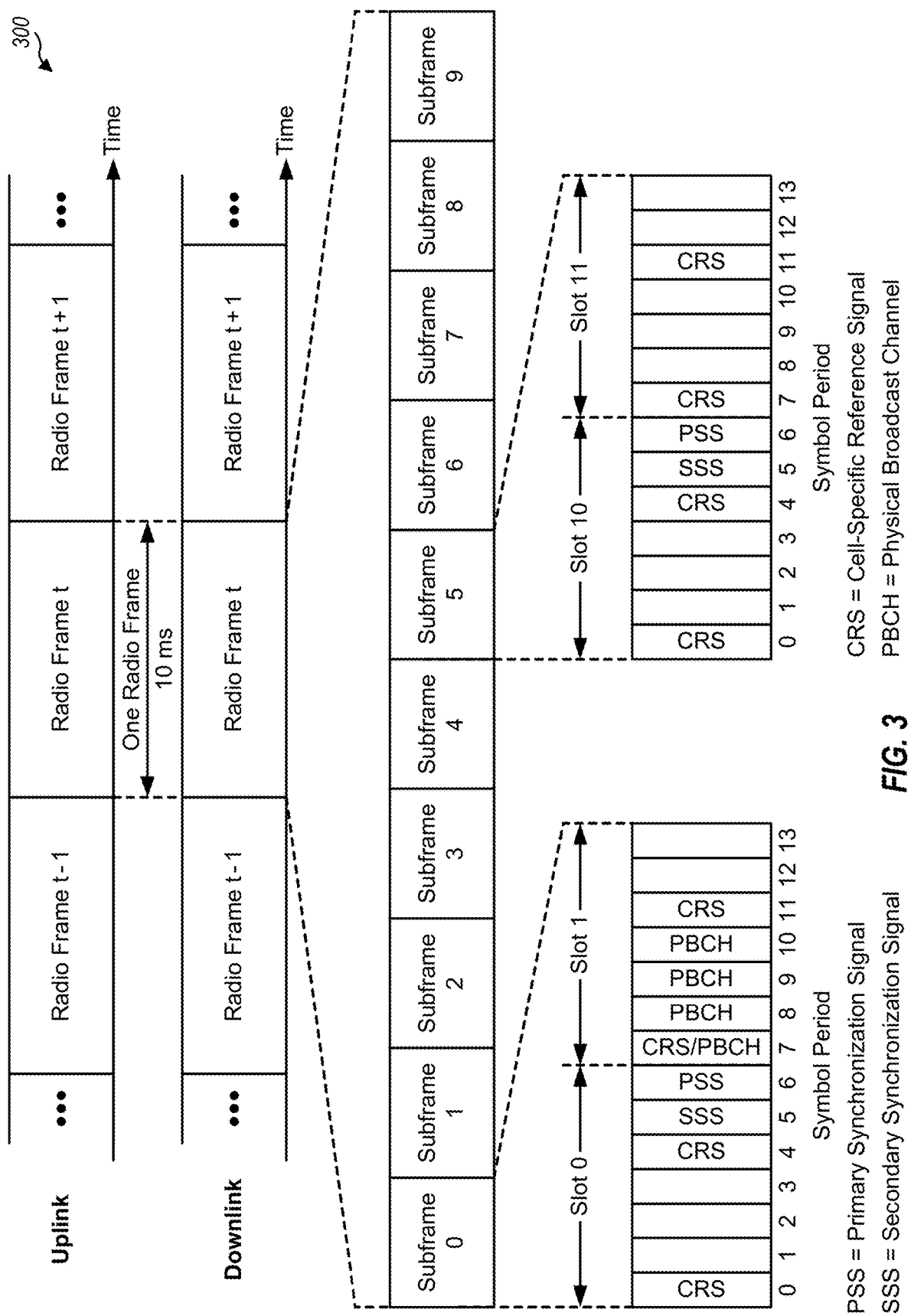
FIG. 3 shows a frame structure for frequency division duplexing (FDD).

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a Physical Broadcast Channel (PBCH) in symbol periods 0 to 3 in slot 1 of certain radio frames. The PBCH may carry some system information. The eNB may transmit other system information such as System Information Blocks (SIBs) on a Physical Downlink Shared Channel (PDSCH) in certain subframes. The eNB may transmit control information/data on a Physical Downlink Control Channel (PDCCH) in the first B symbol periods of a subframe, where B may be configurable for each subframe. The eNB may transmit traffic data and/or other data on the PDSCH in the remaining symbol periods of each subframe.

Figure 4:
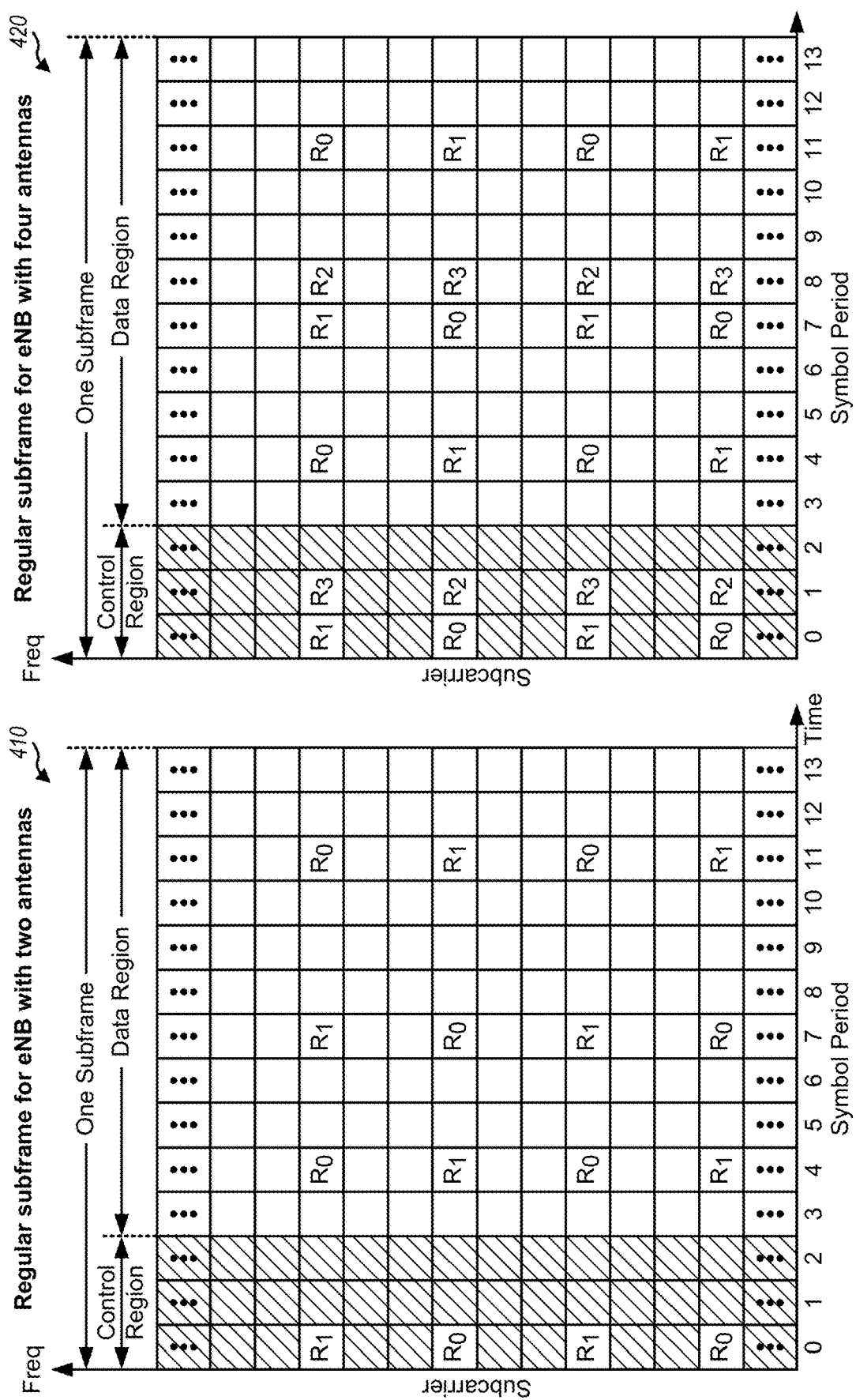
FIG. 4 shows two exemplary subframe formats for the downlink.

FIG. 4 shows two exemplary subframe formats 410 and 420 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label $R_a$, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

Figure 5:
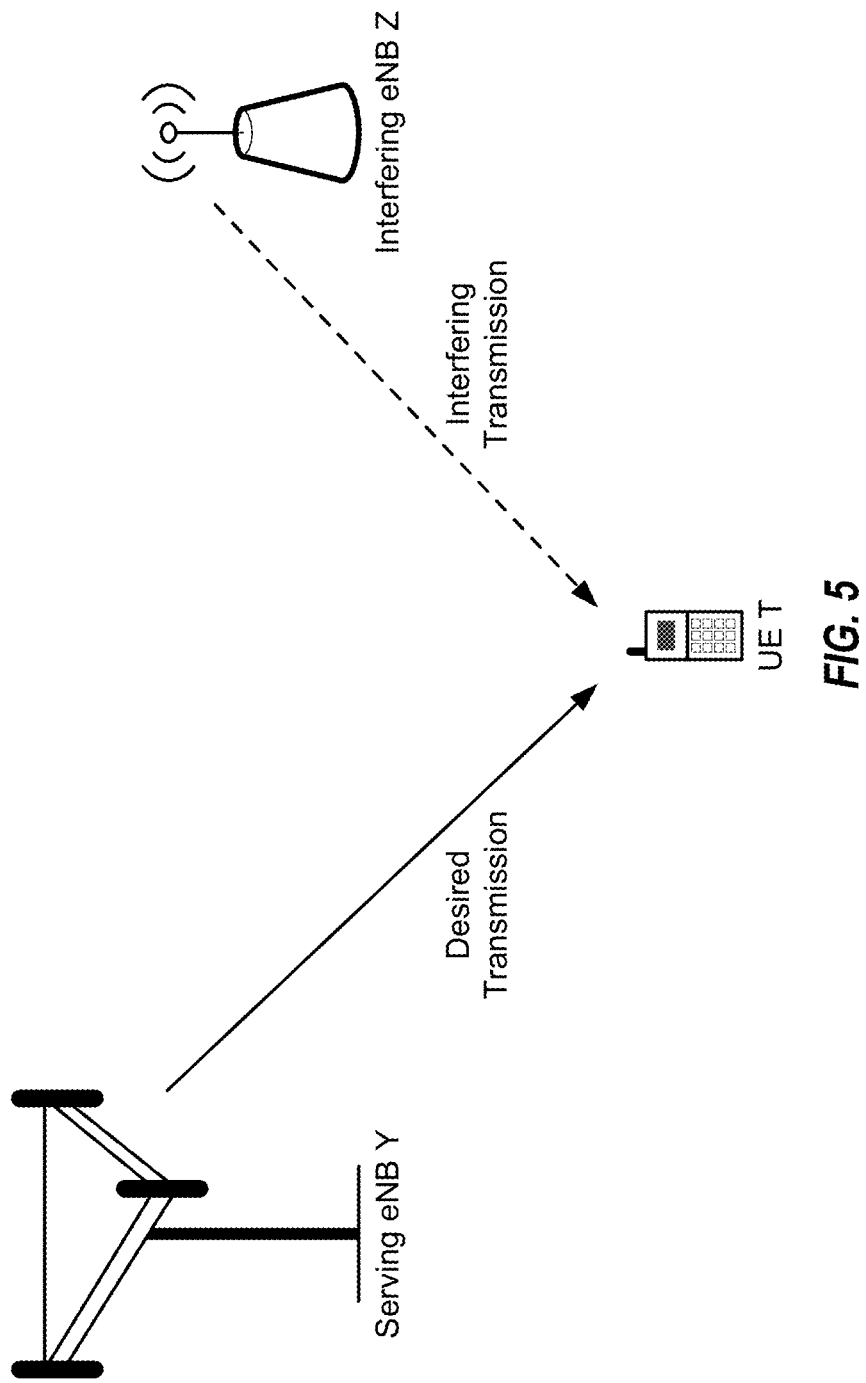
FIG. 5 shows an exemplary dominant interference scenario, in accordance with aspects of the present disclosure.

FIG. 5 shows an exemplary dominant interference scenario. In the example shown in FIG. 5, a UE T may communicate with a serving eNB Y and may observe high interference from a strong/dominant interfering eNB Z.

A dominant interference scenario may occur due to restricted association. For example, in FIG. 5, eNB Y may be a macro eNB, and eNB Z may be a femto eNB. UE T may be located close to femto eNB Z and may have high received power for eNB Z. However, UE T may not be able to access femto eNB Z due to restricted association and may then connect to macro eNB Y with lower received power. UE T may then observe high interference from femto eNB Z on the downlink and may also cause high interference to femto eNB Z on the uplink.

A dominant interference scenario may also occur due to range extension, which is a scenario in which a UE connects to an eNB with lower pathloss and possibly lower SINR among all eNBs detected by the UE. For example, in FIG. 5, eNB Y may be a pico eNB, and interfering eNB Z may be a macro eNB. UE T may be located closer to pico eNB Y than macro eNB Z and may have lower pathloss for pico eNB Y. However, UE T may have lower received power for pico eNB Y than macro eNB Z due to a lower transmit power level of pico eNB Y as compared to macro eNB Z. Nevertheless, it may be desirable for UE T to connect to pico eNB Y due to the lower pathloss. This may result in less interference to the wireless network for a given data rate for UE T.

In general, a UE may be located within the coverage of any number of eNBs. One eNB may be selected to serve the UE, and the remaining eNBs may be interfering eNBs. The UE may thus have any number of interfering eNBs. For clarity, much of the description assumes the scenario shown in FIG. 5 with one serving eNB Y and one interfering eNB Z.

Communication in a dominant interference scenario may be supported by performing inter-cell interference coordination (ICIC). According to certain aspects of ICIC, resource coordination/partitioning may be performed to allocate resources to an eNB located near the vicinity of a strong interfering eNB. The interfering eNB may avoid transmitting on the allocated/protected resources, possibly except for a CRS. A UE can then communicate with the eNB on the protected resources in the presence of the interfering eNB and may observe no interference (possibly except for the CRS) from the interfering eNB.

In general, time and/or frequency resources may be allocated to eNBs via resource partitioning. According to certain aspects, the system bandwidth may be partitioned into a number of subbands, and one or more subbands may be allocated to an eNB. In another design, a set of subframes may be allocated to an eNB. In yet another design, a set of resource blocks may be allocated to an eNB. For clarity, much of the description below assumes a time division multiplex (TDM) resource partitioning design in which one or more interlaces may be allocated to an eNB. The subframes of the allocated interlace(s) may observe reduced or no interference from strong interfering eNBs.

Figure 6:
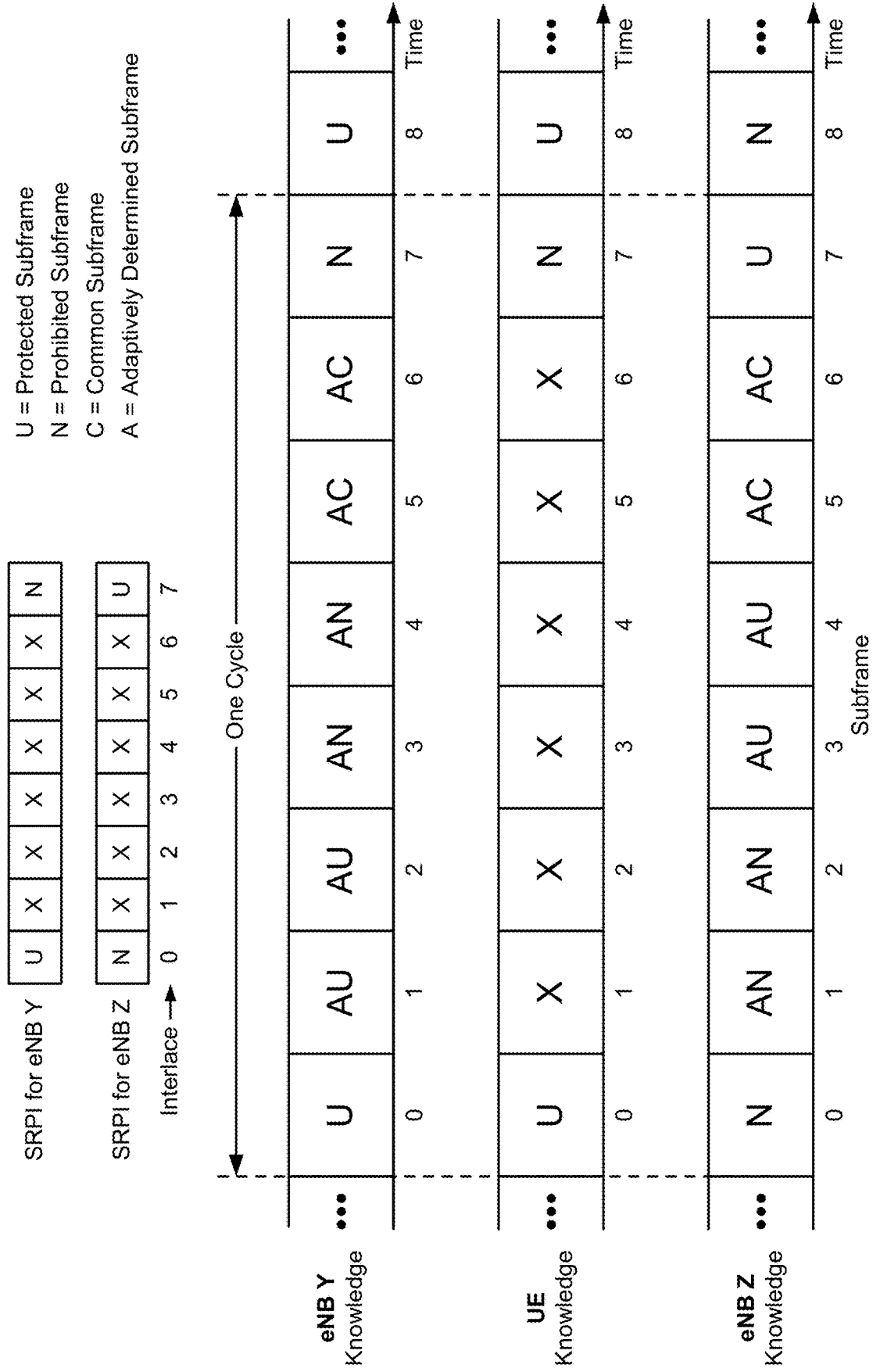
FIG. 6 shows an example partition of resources.

FIG. 6 shows an example of TDM resource partitioning to support communication in the dominant interference scenario in FIG. 5. In the example shown in FIG. 6, eNB Y may be allocated interlace 0, and eNB Z may be allocated interlace 7 in a semi-static or static manner, e.g., via negotiation between the eNBs through the backhaul. eNB Y can transmit data in subframes of interlace 0 and may avoid transmitting data in subframes of interlace 7. Conversely, eNB Z can transmit data in subframes of interlace 7 and may avoid transmitting data in subframes of interlace 0. The subframes of the remaining interlaces 1 through 6 may be adaptively/dynamically allocated to eNB Y and/or eNB Z.

Table 1 lists different types of subframes in accordance with one design. From the perspective of eNB Y, an interlace allocated to eNB Y may include "protected" subframes (U subframes) that can be used by eNB Y and having little or no interference from interfering eNBs. An interlace allocated to another eNB Z may include "prohibited" subframes (N subframes) that cannot be used by eNB Y for data transmission. An interlace not allocated to any eNB may include "common" subframes (C subframes) that can be used by different eNBs. A subframe that is adaptively allocated is denoted with an "A" prefix and may be a protected subframe (AU subframe), or a prohibited subframe (AN subframe), or a common subframe (AC subframe). The different types of subframes may also be referred to by other names. For example, a protected subframe may be referred to as a reserved subframe, an allocated subframe, etc.

TABLE 2

| Subframe Type | Subframe Types Description | Expected CQI |
|---|---|---|
| U | Protected subframe that can be used for data transmission and having reduced or no interference from interfering eNBs. | High CQI |
| N | Prohibited subframe that cannot be used for data transmission. | Low CQI |
| C | Common subframe that can be used for data transmission by different eNBs. | High or Low CQI |

According to certain aspects, an eNB may transmit static resource partitioning information (SRPI) to its UEs. According to certain aspects, the SRPI may comprise Q fields for the Q interlaces. The field for each interlace may be set to "U" to indicate the interlace being allocated to the eNB and including U subframes, or to "N" to indicate the interlace being allocated to another eNB and including N subframes, or to "X" to indicate the interlace being adaptively allocated to any eNB and including X subframes. A UE may receive the SRPI from the eNB and can identify U subframes and N subframes for the eNB based on the SRPI. For each interlace marked as "X" in the SRPI, the UE may not know whether the X subframes in that interlace will be AU subframes, or AN subframes, or AC subframes. The UE may know only the semi-static part of the resource partitioning via the SRPI whereas the eNB may know both the semi-static part and adaptive part of the resource partitioning. In the example shown in FIG. 6, the SRPI for eNB Y may include "U" for interlace 0, "N" for interlace 7, and "X" for each remaining interlace. The SRPI for eNB Z may include "U" for interlace 7, "N" for interlace 0, and "X" for each remaining interlace.

A UE may estimate received signal quality of a serving eNB based on a CRS from the serving eNB. The UE may determine CQI based on the received signal quality and may report the CQI to the serving eNB. The serving eNB may use the CQI for link adaptation to select a modulation and coding scheme (MCS) for data transmission to the UE. Different types of subframes may have different amounts of interference and hence may have very different CQIs. In particular, protected subframes (e.g., U and AU subframes) may be characterized by better CQI since dominant interfering eNBs do not transmit in these subframes. In contrast, CQI may be much worse for other subframes (e.g., N, AN and AC subframes) in which one or more dominant interfering eNBs can transmit. From the point of view of CQI, AU subframes may be equivalent to U subframes (both are protected), and AN subframes may be equivalent to N subframes (both are prohibited). AC subframes may be characterized by a completely different CQI. To achieve good link adaptation performance, the serving eNB should have relatively accurate CQI for each subframe in which the eNB transmits traffic data to the UE.

Random Access (RA) Procedure Enhancements

Certain aspects of the present disclosure provide various mechanisms that allow a user equipment to convey information regarding one or more attributes to a base station during a random access (RA) procedure. The attributes may include, for example a capability of the UE (e.g., to support a particular feature or version of a standard) or a condition of the UE (e.g., if it is currently experiencing an interference condition).

As discussed above, ICIC-capable UEs (referred to herein as non-legacy UEs) may be aware of resource partitioning information (e.g., identifying U, AU and N sub-frames), whereas non-ICIC-capable UEs (typically referred to as legacy UEs) are typically unaware of them. Knowing the partition in TDM partition frames may allow non-legacy UEs to reliably send and receive various random access (RA) messages.

However, current systems may have multiple issues with carrying out a standard random access (RA) procedure in heterogeneous networks. For example, there is no straightforward mechanism for an eNB to differentiate between legacy and non-legacy UEs performing RA. Further, current RA timing defined in RA specifications may not align with the periodicity of ARPI (e.g., 8 ms in the examples described above). For example, message 3 in an RA procedure is sent 6 ms after message 2 is received, which may fall on an unprotected subframe and cause interference to neighboring cells.

In view of the above discussion, it may be appreciated that there is a need for mechanisms that allow an eNB to differentiate between a legacy and a non-legacy UE and a new timeline for RA in non-legacy UEs that matches with the ARPI periodicity of U sub-frames which are known by non-legacy UEs.

An eNB needs to know whether a UE is non-legacy, in order to apply a different RA procedure timeline as opposed to the legacy UE RA procedure. There are multiple messages that are exchanged between a UE and an eNB or base station while a UE accesses the base station. These messages may be used by a UE to inform the base station whether it is a legacy or a non-legacy UE. There may be various options to do the same. In a similar manner, according to certain aspects, a UE may be able to indicate attributes (other than RPI capability) such as whether the UE has detected an interference condition.

Certain aspects of the present disclosure provide techniques for utilizing random access (RA) procedures performed by a user equipment (UE) to convey information regarding attributes, such as RPI capability or detected interference conditions, to a base station (BS).

Figure 7:
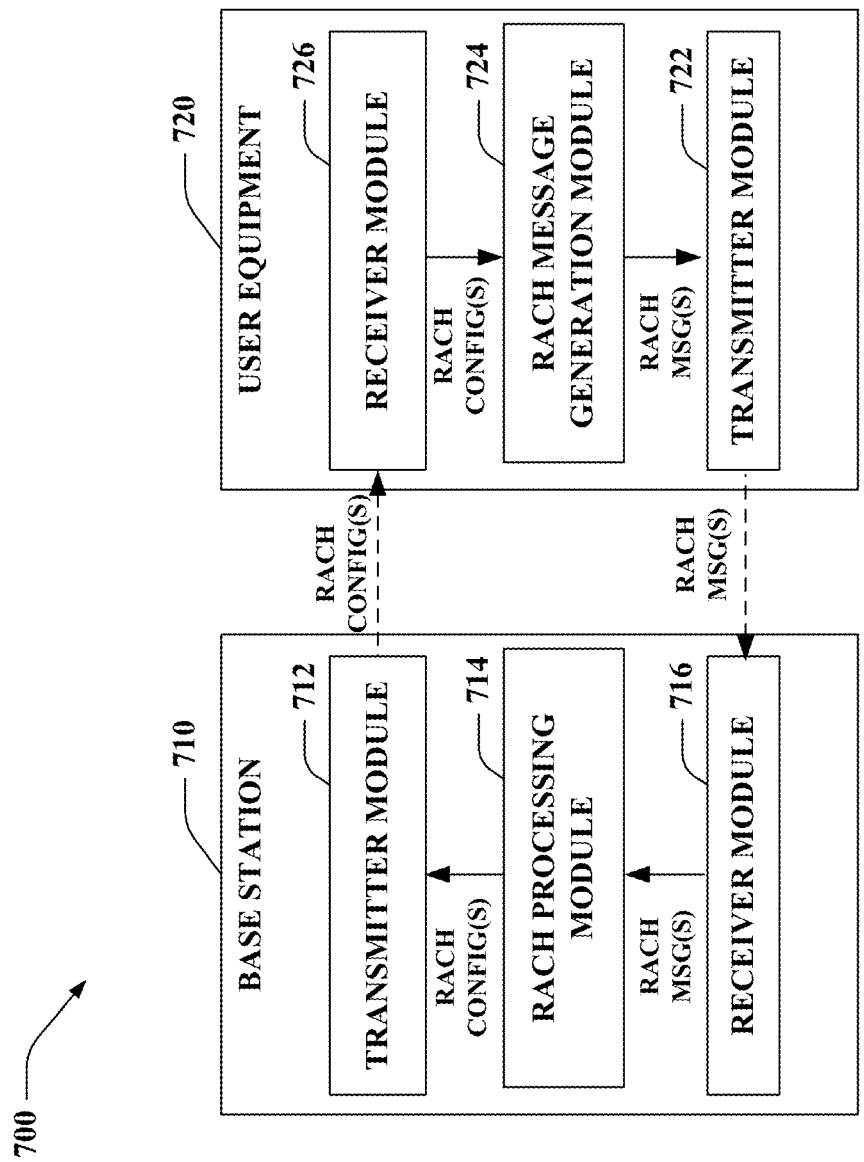
FIG. 7 shows example functional components of a base station and a UE, in accordance with certain aspects of the present disclosure.

FIG. 7 illustrates an example system 700 with a base station 710 (e.g., an eNB) and UE 720, capable of performing the RA procedures described herein. As illustrated, the base station 710 may include a random access channel (RACH) processing module 714. The RACH processing module 714 may generate one or more RACH configurations to be transmitted, via a transmitter module 712, to the UE 720. The UE 720 may receive the RACH configuration(s), via a receiver module 726, and configure a RACH message generation module 724 accordingly.

In this manner, the BS 710 may configure the UE with the different RACH configurations, where each configuration may be used under a particular UE capability and/or interference condition. When performing an RA procedure, the RACH message generation module 724 may generate one or more RACH messages to be transmitted to the BS 710, via a transmitter module 722.

The BS 710 may receive the RACH messages, via a receiver module 716, and the RACH processing module 714 may process the messages to identify an attribute of the UE based on the corresponding RA procedure used by the UE. For example, the BS 710 may be able to determine, based on the RA procedure, whether the UE 710 is capable of recognizing RPI and/or whether the UE 710 has detected an interference condition.

Exactly how a UE is configured to utilize different RA procedures to indicate an attribute (e.g., a capability or interference condition) may differ with different embodiments. According to certain aspects, a UE may include information in at least part of a message (e.g., at least in a part of the message 1, message 3, or message 5) which indicates whether a UE transmitting the message is a non-legacy UE (capable of recognizing resource partitioning information (RPI).

According to certain aspects, such information may include utilizing different and distinct PRACH sequences for legacy and non-legacy UEs. The sequences may include, for example, different root sequences or different orthogonal shifts of the same root sequences for the legacy and non-legacy UEs. The sequences may also be signaled to the UEs, for example, through SIB-2 for non-legacy UEs. According to certain aspects, the information included in a message 1 may be conveyed by using distinct frequency locations for legacy and non-legacy UEs. Thus, this may include using the same set of root sequences, but in different frequencies for legacy and non-legacy UEs. According to certain aspects, the information included in message 1 may be distinct time locations for legacy and non-legacy. This may include using same set of root sequences but in different time locations for legacy and non-legacy UEs.

According to certain aspects, message 3 may be used to indicate a distinction between a legacy and a non-legacy UE. Message 1, in this case, may remain unchanged relative to previous or current versions of a standard. PRACH configuration may remain the same. However, legacy and non-legacy UEs may have different responses to receiving message 2 from a base station. For example, the message 2 may include a delay bit that controls when a non-legacy UE transmits a message 3. For example, if there is no delay bit (or bit not set) included in message 2, legacy UEs transmit message 3 at n+6 and non-legacy UEs may transmit at a next protected (e.g., U sub-frame), with 'n' being the sub-frame in which message 2 is received. If there is a delay bit included in message 2, legacy UEs may transmit message 3 at a later time (e.g., at n+7 rather than n+6), and non-legacy UEs transmit message 3 at the next subframe (after n+7). Since the base station does not know what kind of UE is accessing until it receives message 3, it may have to decode two sub-frames. For example, the base station may first attempt to decode message 3 at the n+6 or n+7 sub-frames (depending on the delay bit). If it does not find message 3 at the n+6 or n+7 sub-frames, it may decode the first U sub-frame after n+6 or n+7. Thus, with this approach, the base station may need to reserve twice the number of uplink resources for message 3. For some aspects, the non-legacy UEs may be limited to N HARQ transmissions, even though they have cleared resources in order to avoid jamming or interference in neighboring cells.

According to certain aspects, message 5 may be used to indicate a distinction between a legacy and a non-legacy UE. In this case, message 1 and message 3 may remain the same. The RA procedure may be identical for legacy and non-legacy UEs. However, the base station may be made aware of whether a UE is legacy or not after reception of message 5. In this aspect, a communication of all the messages between a UE and a base station until message 5 may have to be repeated multiple times on unprotected sub-frames until all the messages are successfully communicated.

Figure 8:
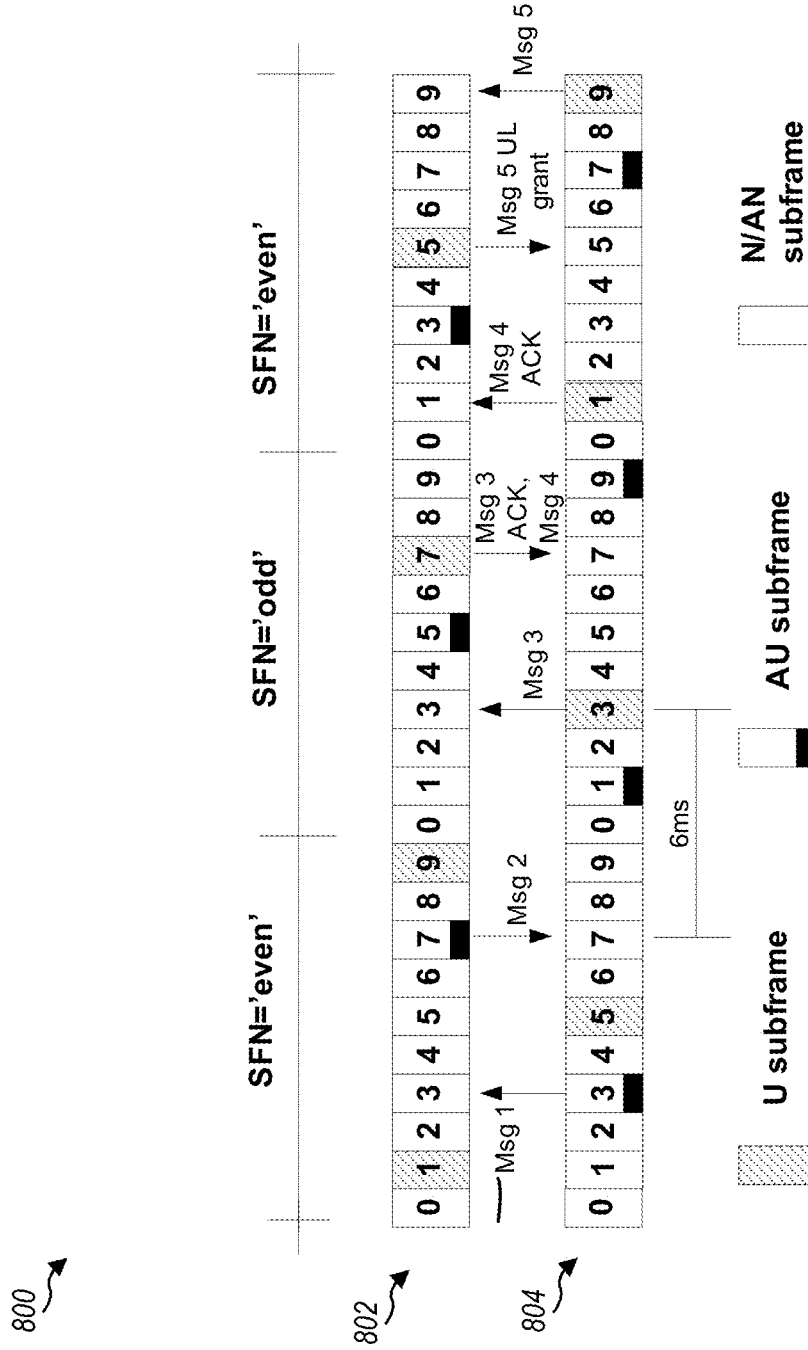
FIG. 8 shows an exemplary scheme in which a base station allows UEs to perform access under resource partitioning, in accordance with certain aspects of the present disclosure.

FIG. 8 shows a diagram 800 conceptually illustrating an operation of a base station with a legacy UE (user equipment) under TDM (Time Division Multiplexing) partitioning in accordance with an aspect of the present disclosure. Diagram 800 illustrates a mechanism in which the base station allows legacy UEs to perform access under resource partitioning. Frame 802 is a TDM-partitioned downlink frame, and frame 804 is a TDM partitioned uplink frame. In the example, there is a time shift of about 4 ms between downlink frame 802 and uplink frame 804.

As illustrated by the legend with different shading, sub-frames 1, 5, 9, in even system frame numbers (SFNs) and subframes 3 and 7 in odd SFNs may correspond to U subframes, subframes 3 and 7 in even SFNs and subframes 1, 5, and 9 in odd SFNs may correspond to adaptive U (AU) subframes, while all other subframes may be N or AN subframes. Sub-frames U and AU are reliable sub-frames as they provide little or no interference to messages communicated during their period. N/AN sub-frames are non-reliable sub-frames as messages communicated during their period may experience interference or cause jamming to neighboring cells.

As noted above, legacy UEs may not be aware of this partitioning. Nonetheless, an eNB may configure the UE to perform RACH procedures in manner resulting in RACH messages being exchanged in a sequence that align with protected (U/AU) subframes.

For example, as illustrated, the UE may be configured to initiate an RA procedure by transmitting a first message (Msg 1) in the AU sub-frame 3 (of the first even SFN), causing the BS to respond with a second message (Msg 2) in AU sub-frame 7 (of the first even SFN). 6 subframes later, the UE may send a third message (Msg 3) in U subframe 3 (of the odd SFN), prompting the base station to send an ACK of Msg 3 (with a Msg 4) transmitted from the BS in U subframe 7 (of the odd SFN). The UE may send an ACK of Msg 4 in U subframe 1 (of the second even SFN). The BS may send an uplink grant for a fifth message (Msg 5) in U subframe 5 (of the second even SFN) and the UE may send Msg 5 in U subframe 9 (of the second even SFN).

According to certain aspects, the base station may negotiate only U sub-frames with the neighboring cells and does not allow HARQ for the third message. In this mechanism PHICH for the third message is not sent. The third message is sent on the (n+6)th sub-frame and may create jamming on neighboring cells. Also, a third message sent on the (n+6)th sub-frame in a neighboring cell may cause interference with the base station. A higher power setting in the UL grant can be used to increase chances of success in the first transmission of the third message. Additionally, restricting the UE to a single transmission of the third message avoids power racing conditions.

For some aspects, the base station negotiates only U sub-frames with the neighboring cells and reserves additional sub-frames for RACH. A special negotiation beyond ARPI for only RA is needed.

Figure 9:
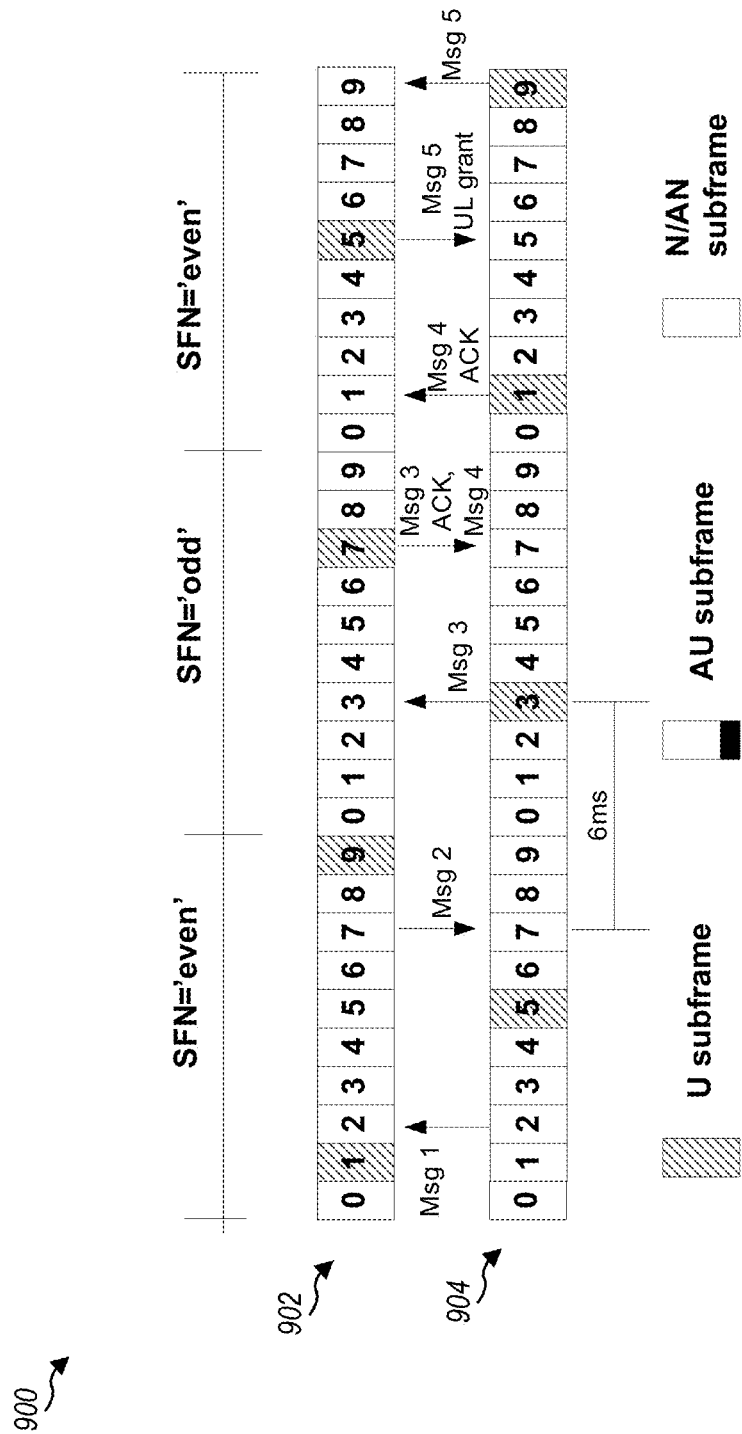
FIG. 9 shows an exemplary scheme in which a base station allows UEs to perform access under resource partitioning, in accordance with certain aspects of the present disclosure.

FIG. 9 shows a diagram 900 conceptually illustrating an operation of a base station with a legacy UE (user equipment) under TDM (Time Division Multiplexing) partitioning in accordance with an aspect of the present disclosure. Diagram 900 illustrates another mechanism in which the base station allows legacy UEs to perform access under resource partitioning. Frame 902 is a TDM-partitioned downlink frame, and frame 904 is a TDM partitioned uplink frame. As with the example frame structure in FIG. 8, there may be a time shift of about 4 ms between downlink frame 902 and uplink frame 904.

As illustrated by the legend with different shading, sub-frames 1, 5, and 9, in even system frame numbers (SFNs) and subframes 3 and 7 in odd SFNs may correspond to U subframes, while all other subframes may be N or AN subframes.

In this example, an eNB may control when it transmits its messages during a RA procedure, such that subsequent messages from the UE are transmitted in protected sub-frames. For example, as illustrated, the UE may initiate an RA procedure by transmitting a first message (Msg 1) in sub-frame 2 (of the first even SFN). Assuming the UE will transmit a Msg 3 6 subframes after receiving a Msg 2, the eNB may transmit the Msg 2 in subframe 7 (of the first even SFN), thereby aligning the UE Msg 3 transmission in protected subframe 3 (of the odd SFN). Similarly, the eNB may transmit Msg 4 in subframe 7 (of the odd SFN), causing Msg 4 ACK to be transmitted (4 ms later) in protected subframe 1 (of the second even SFN). Finally, the eNB may send an uplink grant for Msg 5 in subframe 5 (of the second even SFN), causing the UE to tranmsit Msg 5 in protected subframe 9 (of the second even SFN).

This mechanism for example, allows a femto UE to access its own cell, with a small impact to a macro UE under covering the femto cell. This mechanism is typically used when a cell has not had any communications from UE for an extended period of time and has lost all but one of its reliable sub-frames to neighboring cells through negotiation. This mechanism may be implemented with relatively little overhead and performance cost.

Figure 10:
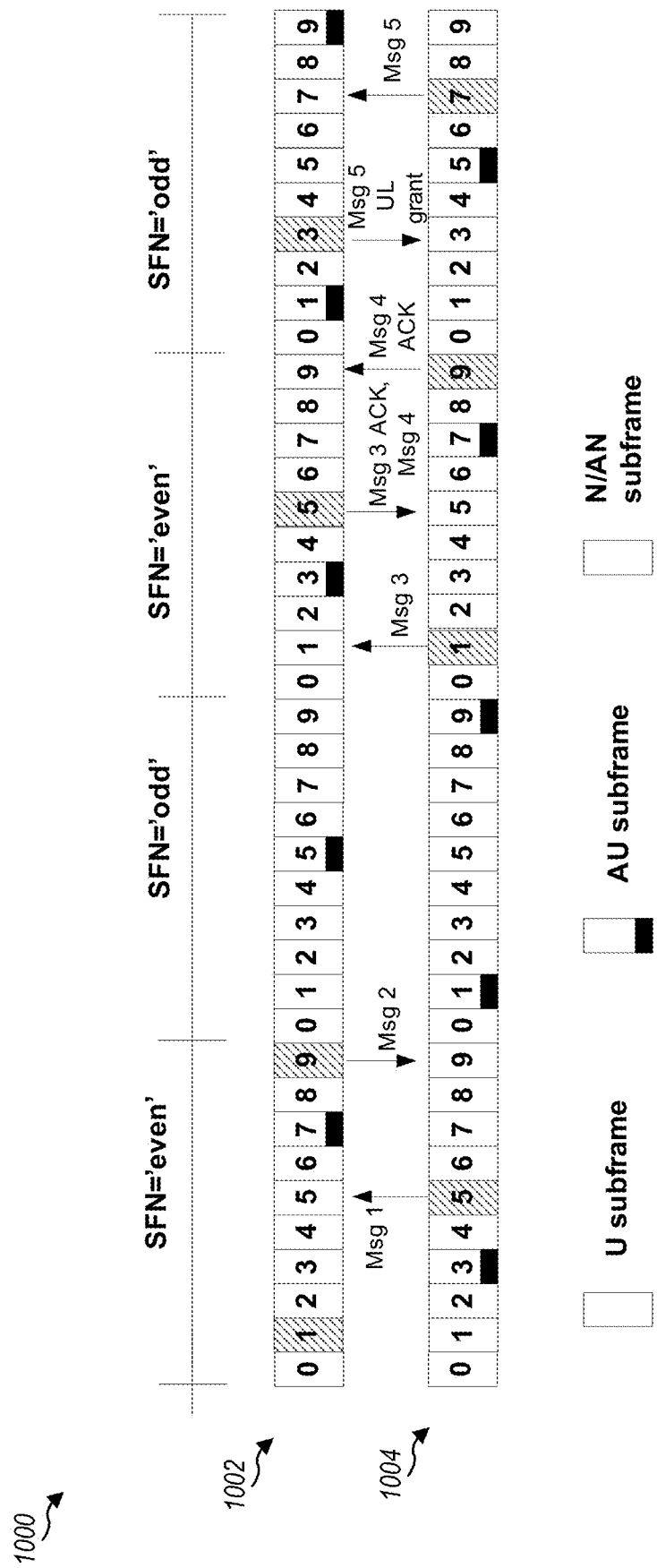
FIG. 10 shows an exemplary scheme in which a base station allows UEs to perform access under resource partitioning, in accordance with certain aspects of the present disclosure.

FIG. 10 shows a block diagram 1000 conceptually illustrating an operation of a base station with a non-legacy UE under TDM partition in accordance with an aspect of the present disclosure. Block diagram 1000 illustrates a mechanism in which the base station allows a non-legacy UE to perform access under resource partition using a modified RA timeline. In this mechanism the base station may identify the accessing UE as a non-legacy UE based on one of the messages it receives from the UE during the RA procedure.

In the illustrated example, frame 1002 is a TDM-partitioned downlink frame, and frame 1004 is a TDM partitioned uplink frame. As with the examples shown in FIGS. 8 and 9, there may be a time shift of about 4 ms between downlink frame 1002 and uplink frame 1004.

Similar to the example shown in FIG. 8, subframes 1, 5, 9, in even system frame numbers (SFNs) and subframes 3 and 7 in odd SFNs may correspond to U subframes, sub-frames 3 and 7 in even SFNs and subframes 1, 5, and 9 in odd SFNs may correspond to adaptive U (AU) subframes, while all other subframes may be N or AN subframes. Sub-frames U and AU are reliable sub-frames as they provide little or no interference to messages communicated during their period. N/AN sub-frames are non-reliable sub-frames as messages communicated during their period may experience interference or cause jamming to neighboring cells.

As noted above, non-legacy UEs may not aware of this partitioning and, thus, may be configured by an eNB to transmit RA messages on protected subframes.

Thus, the UE may initiate the RA procedure by transmitting Msg 1 in U subframe 5 (of the first even SFN). According to certain aspects, information identifying an attribute of the UE (e.g., as non-legacy or having detected interference) may be sent with Msg 1. In such caes, on receiving Msg 1, the base station may identify the attribute.

If the base station identifies the UE as non-legacy, the base station may use modified timing (relative to leagcy UEs). Thus, the base station may transmit Msg 2 in subframe 9 (of the first even SFN). As discussed above, the non-legacy UE, on receiving Msg 2 may transmit Msg 3. In this case, however, rather than transmit with a fixed period after receiving Msg 2 (e.g., n+6), the UE may transmit in the next U subframe (subframe 1 of the second even SFN). In this example, there are no U subframes in the first odd SFN.

The eNB may transmit an ACK of Msg 3 and send Msg 4 in U subframe 5 (of the second even SFN), causing the UE totransmit Msg 4 ACK (4 ms later) in U subframe 9 (of the second even SFN). Finally, the eNB may send an uplink grant for Msg 5 in subframe 4 (of the second odd SFN), causing the UE to tranmsit Msg 5 in U subframe 7 (of the second odd SFN).

As illustrated in FIG. 10, all the RA messages exchanged between the non-legacy UE and the base station may be communicated in reliable U sub-frames. Thus, the modified RA time line may make the communication of every message reliable and interference free.

For some aspects, if the non-legacy UE is not aware of the locations of the U sub-frames, the base station may the non-legacy UE to transmit Msg 3 in a specific sub-frame. The base station may inform the non-legacy UE of the specific sub-frame by an indication in SIB or in the second message. For some aspects, the non-legacy UE is not identified by the first message, the base station may proceed with the original unmodified RA timeline. Alternatively, the second message (control and data portions) may be sent on specific resources cleared by cells (e.g., R-PDCCH, R-PDSCH). This may be applicable to MBSFN and non-MBSFN sub-frames.

Figure 11:
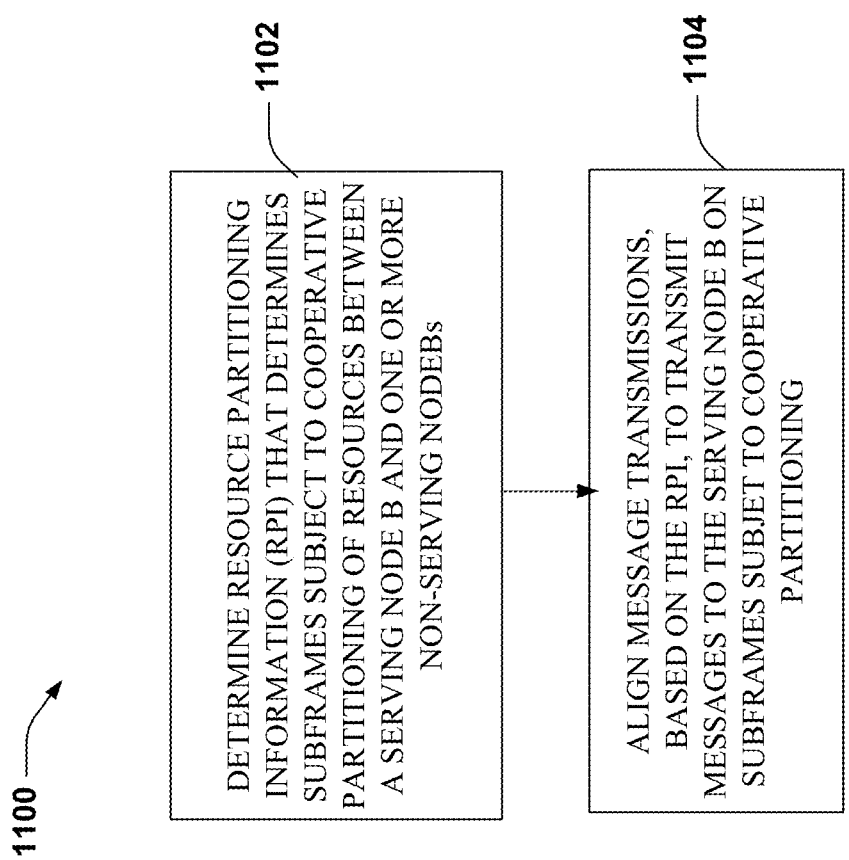
FIG. 11 is a flow diagram illustrating example operations in accordance with an aspect of the present disclosure.

FIG. 11 illustrates example operations 1100 in accordance with an aspect of the disclosure. In block 1102 resource partitioning information (RPI) that determines subframes subject to cooperative partitioning of resources between a serving Node B and one or more non-serving Node Bs is determined. In block 1104 message transmissions are aligned, based on the RPI, to transmit messages to the serving Node B on subframes subject to cooperative partitioning.

FIG. 12 illustrates example operations 1200 that may be performed, for example by a serving base station (e.g., node B), in accordance with an aspect of the disclosure. In block 1202 the serving node receives at least one transmission from at least one user equipment (UE). In block 1204, the serving node B determines, based on the at least one transmission, whether or not the at least one UE is capable of being aware of subframes subject to cooperative partitioning of resources between a serving Node B and one or more non-serving Node Bs.

FIG. 13 illustrates example operations 1300 that may be performed, for example by a UE, in accordance with an aspect of the disclosure. In block 1302, the UE sends at least one transmission to a serving Node B. In block 1304, the UE determines at least one parameter of the at least one transmission to indicate capability of being aware of subframes subject to cooperative partitioning of resources between a serving Node B and one or more non-serving Node Bs.

FIG. 14 illustrates example operations 1400 for wireless communication between a UE and a serving node B in accordance with an aspect of the disclosure. In block 1402 a subframe subject to cooperative partitioning of resources is identified between a serving Node B and one or more non-serving Node Bs. In block 1404, an indication of the identified subframe is provided to a user equipment (UE) for performing random access to the serving Node B.

FIG. 15. illustrates example operations 1500 is a flow diagram illustrating an operation of a UE in accordance with an aspect of the disclosure. In block 1502, a UE receives an indication of a subframe subject to cooperative partitioning of resources between a serving Node B and one or more non-serving Node Bs. In block 1504, the UE performs random access to the serving Node B using the identified subframe.

The methods described above may be used to identify UE legacy and non-legacy capabilities during random access procedures. A similar method may be used to determine other attrivutes, such as a UE experiencing interference conditions. For example, a legacy UE may always follow the same RA procedure. A newer, non-legacy, UE may determine whether it is under strong interference conditions, such as determining if it is trying to access macro while being under the coverage area of a femto. RSRP and RSRQ measurements may be used for this purpose. If the UE is not in a strong interference condition, it may follow the legacy RA procedure. Hence, the Node B may not be able to distinguish it from a legacy UE. If the UE is in a strong interference condition, it may follow the newer RA procedure. This may be because if a newer UE is not experiencing strong interference, the existing procedure may work well, and there may be no need for the Node B to treat it differently from a legacy UE.

According to certain aspects, to distinguish newer UEs (e.g., UEs capable of complying with LTE Rel. 10 standards or later) from legacy UEs, newer UEs that want to follow a different procedure (for example, to claim their capabilities, or because they are in strong interference) may send one or more preambles. If multiple preambles are sent, the resources used for the preambles may be tightly related and follow a pre-defined rule of which the Node B may be aware. For example, two preambles may be sent in the same subframe but different (related) frequency resources. Or, two preambles may be set with different (related) preamble IDs. Or, two preambles may be sent in different (related) subframes so long as the two subframes are close enough.

When the Node B detects two preambles which obey the new Rel-10 rule and received with the same timing and power (within a certain threshold), the Node B may conclude that the two preambles came from the same UE. There may be a negligible probability that two separate UEs are actually following legacy procedures and that they picked the associated preambles and time/frequency resources by coincidence.

If the Node B detects that the two preambles obey the rule, the Node B may know that it may be a Rel-10 UE in strong interference. Only one random access response, corresponding to one of the associated preambles (determined by the rule), may be transmitted. Note that these methods may not need any updates of the RACH configuration parameters, nor any specific parameter for Rel-10 UEs except for the predefined rule which may be hardcoded.

Message 3, like message 1, may be used for the UE to notify the Node B that it is experiencing strong interference. Namely, message 3 may include RSRP/RSRQ measurement report, or a single bit determining whether, based on threshold selected by UE or network, UE is experiencing a strong interference. The threshold may be broadcast by a Node B in one of the SIBs, and may be interpreted by Rel-10 UEs only. Based on the reported measurement (or the "severe interference" bit), a Node B may know the UE's current interference conditions and act accordingly. For example, the Node B may trigger partition changes, take specific scheduling decisions for that UE, etc. The Node B may want to decide whether the UE must report measurements in message 3 or not. Message 2 may be used for this purpose. Message 2 may include a CQI request bit, whose meaning may be undefined in the contention-based RA. Alternatively, message 3 may be hijacked by the Node B to poll a measurement report to the UE. Namely, Rel-10 UE monitors this bit. If it is enabled, RSRP/RSRQ measurements may be reported in message 2. During handover, a Node B may inform the UE by adding a new bit (new IE) into MobilityControlInfo (handover command). For example, a macro UE being handed over to pico range expansion.

Message 5 may also be used for the UE to notify the Node B that it is experiencing strong interference. Message 5 may be transmitted by UE after RCConnectionSetup, or another NAS message. Message 5 may include RSRP/RSRQ measurement report. Since at this stage the eNB may still not know whether the UE is under severe interference, scheduling assignments (DL) and grants (UL) may be on "clean" subframes (assuming portioning is already enabled). The goal of this may be to maximize reliability of these important control messages. Once interference information is known at the Node B, scheduling may be realized (if UE is not in severe interference). Similarly, as previously described, the Node B may want to specifically ask the UE for measurement reports in message 5. Message 4, like message 5, may be used for this purpose. Namely, a new bit (e.g., a new IE) in RRCConnectionSetup message. Rel-10 UE may interpret this bit and perform measurements reports in message 5 if this bit is set.

A new method for RACH procedure under high interference, which may not require the previously described changes in message 1 or RACH timeline may be described in three steps. First, message 1 may be sent as in Rel8. The Node B may not differentiate between UEs or between high/low interference conditions experienced by the UE. Second, message 2 may be sent as in Rel8 with the following setting. The number of HARQ transmissions of message 3=1. This setting may be desirable to avoid UL jamming on neighbor cells if message 3 falls on an unprotected subframe. Third, the UE may send message 3. In high interference conditions, a non-legacy UE ACK/NACK from Node B for message 3 may fall on an unprotected subframe and may be lost. Hence, UE in this case may ignore the ACK/NACK information (e.g., the fact that the Msg 3 was not successfully ACK'd) and attempt to decode message 4 anyway. According to certain aspects, if message 4 is successfully decoded, RACH procedure continues as in Rel8. Otherwise, the procedure may be restarted.

FIG. 16 illustrates example operations 1600 that may be performed by a UE in accordance with an aspect of the disclosure. At 1602, a UE determines whether an interference condition exist. At 1604, the UE utilizes a first random access (RA) procedure if it is determined the interference condition does not exist. At 1606, the UE utilizes a second RA procedure if it is determined the interference condition exists.

FIG. 17 illustrates example operations 1700 that may be performed by a base station in accordance with an aspect of the present disclosure. At 1702, a base station configures a UE with multiple RA procedures to allow the UE to indicate the presence of an interference condition. At 1704, the base station determines whether or not the UE is experiencing an interference condition based on an RA procedure used by the UE.

FIG. 18 illustrates example operations 1800 that may be performed by a UE in accordance with an aspect of the disclosure. At 1802, a UE generates at least a first and second preamble. At 1804, the UE transmits the first and second preambles to indicate to a base station one or more RA procedures the UE is capable of perform.

FIG. 19 illustrates example operations that may be performed by a base station in accordance with an aspect of the disclosure. At 1902, a base station receives, from a UE, at least a first and second preamble. At 1904, the base station determines, based on the first and second preambles, one ore more RA procedures the UE is capable of performing.

FIG. 20 illustrates example operations 2000 that may be performed by a UE in accordance with an aspect of the disclosure. At 2002, the UE determines an interference condition exists. At 2004, the UE transmits a message notifying a base station the interference condition exists.

FIG. 21 illustrates example operations 2100 that may be performed by a base station in accordance with an aspect of the disclosure. At 2102, a base station receives a message from a UE. At 2104, the base station determines, based on the message, that the UE has determined an interference condition exists.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a base station (BS), comprising:
    configuring, by the BS, a user equipment (UE) with parameters for performing different types of random access (RA) procedures, wherein performance of the different types of RA procedures is based, at least in part, on at least one attribute of the UE, wherein the at least one attribute indicates whether or not the UE is capable of being aware of subframes subject to cooperative partitioning of resources between the BS and one or more non-serving BSs, and wherein the different types of RA procedures comprise:
        a first type of RA procedure to indicate the UE is capable of complying with a first version of a standard; and
        a second type of RA procedure to indicate the UE is capable of complying with a second version of the standard later than the first version;
    receiving, by the BS, one or more RA messages sent in accordance with one of the types RA procedures; and
    identifying, by the BS, the at least one attribute of the UE based on the type of RA procedure used, wherein the at least one attribute of the UE indicates a capability to support a particular version of a wireless communications standard.

2. The method of claim 1, wherein:
the at least one attribute further indicates an interference condition by the UE.

3. The method of claim 2, further comprising:
determining the UE has not detected the interference condition if the UE utilizes a first type of RA procedure; and
determining the UE has detected the interference condition if the UE utilizes a second type of RA procedure.

4. The method of claim 3, further comprising:
transmitting resource partitioning information (RPI) to the UE for use in performing the second type of RA procedure, the RPI indicating subframes subject to cooperative partitioning of resources between the BS and one or more non-serving BSs.

5. The method of claim 3, wherein the receiving comprises:
receiving a message comprising at least one of a Reference Signal Received Power (RSRP) measurement or a Reference Signal Received Quality (RSRQ) measurement.

6. The method of claim 5, further comprising:
transmitting a threshold value, wherein at least one of the received RA messages indicates at least one of a Reference Signal Received Power (RSRP) measurement or a Reference Signal Received Quality (RSRQ) measurement exceeds the threshold value.

7. The method of claim 6, wherein transmitting the threshold value comprises broadcasting the threshold value in a system information block (SIB).

8. The method of claim 2, wherein at least one of the RA messages comprises a bit indicating the interference condition exists.

9. The method of claim 2, further comprising:
transmitting a message with a delay bit set; and
receiving a message that the interference condition exists at a later time than if the delay bit was not set.

10. The method of claim 1, wherein:
the receiving comprises receiving at least one preamble transmitted from the UE; and
the identifying comprises identifying the at least one attribute based on the at least one preamble.

11. The method of claim 10, wherein the at least one preamble comprises at least first and second preambles.

12. The method of claim 11, wherein the first and second preambles are received in a same subframe but using different frequency resources.

13. The method of claim 11, wherein the first and second preambles are received with different preamble IDs.

14. The method of claim 11, wherein the first and second preambles are received in different subframes.

15. The method of claim 11, wherein the receiving comprises:
concluding that the first and second preambles are received from the same UE if the first and second preambles are received with timing and power that differs less than a threshold amount.

16. The method of claim 1, wherein the determining comprises:
determining the UE is capable of being aware of subframes subject to cooperative partitioning if the one or more RA messages comprise a defined sequence transmitted on a random access channel.

17. The method of claim 1, wherein the determining comprises:
determining the UE is capable of being aware of subframes subject to cooperative partitioning if the one or more RA messages is sent using predefined frequency resources.

18. The method of claim 1, wherein the determining comprises:
determining the UE is capable of being aware of subframes subject to cooperative partitioning if the one or more RA messages is sent in a predefined time location.

19. An apparatus for wireless communications, comprising:
means for configuring user equipment (UE) with parameters for performing different types of random access (RA) procedures, wherein performance of the different types of RA procedures is based, at least in part, on at least one attribute of the UE, wherein the at least one attribute indicates whether or not the UE is capable of being aware of subframes subject to cooperative partitioning of resources between the BS and one or more non-serving BSs, and wherein the different types of RA procedures comprise:
a first type of RA procedure to indicate the UE is capable of complying with a first version of a standard; and
a second type of RA procedure to indicate the UE is capable of complying with a second version of the standard later than the first version;
means for receiving one or more RA messages sent in accordance with one of the types of RA procedures; and
means for identifying the at least one attribute of the UE based on the type of RA procedure used, wherein the at least one attribute of the UE indicates a capability to support a particular version of a wireless communications standard.

20. The apparatus of claim 19, wherein:
the at least one attribute further indicates an interference condition by the UE.

21. The apparatus of claim 20, comprising:
means for determining the UE has not detected the interference condition if the UE utilizes a first type of RA procedure; and
means for determining the UE has detected the interference condition if the UE utilizes a second type of RA procedure.

22. The apparatus of claim 19, wherein:
the means for receiving comprises means for receiving at least one preamble transmitted from the UE; and
the means for identifying comprises means for identifying the at least one attribute based on the at least one preamble.

23. The apparatus of claim 22, wherein the at least one preamble comprises at least first and second preambles.

24. An apparatus for wireless communications, comprising:
at least one processor configured to:
configure a user equipment (UE) with parameters for performing different types of random access (RA) procedures, wherein performance of the different types of RA procedures is based, at least in part, on at least one attribute of the UE, wherein the at least one attribute indicates whether or not the UE is capable of being aware of subframes subject to cooperative partitioning of resources between the BS and one or more non-serving BSs, and wherein the different types of RA procedures comprise:
a first type of RA procedure to indicate the UE is capable of complying with a first version of a standard; and
a second type of RA procedure to indicate the UE is capable of complying with a second version of the standard later than the first version;
receive one or more RA messages sent in accordance with one of the types of RA procedures; and
identify the at least one attribute of the UE based on the type of RA procedure used, wherein the at least one attribute of the UE indicates a capability to support a particular version of a wireless communications standard; and
a memory coupled with the at least one processor.

25. A non-transitory computer readable medium of an apparatus having instructions stored thereon, the instructions executable by one or more processors for:
configuring, by the apparatus, a user equipment (UE) with parameters for performing different types of random access (RA) procedures, wherein performance of the different types of RA procedures is based, at least in part, on at least one attribute of the UE, wherein the at least one attribute indicates whether or not the UE is capable of being aware of subframes subject to cooperative partitioning of resources between the BS and one or more non-serving BSs, and wherein the different types of RA procedures comprise:
a first type of RA procedure to indicate the UE is capable of complying with a first version of a standard; and
a second type of RA procedure to indicate the UE is capable of complying with a second version of the standard later than the first version;
receiving, by the apparatus, one or more RA messages sent in accordance with one of the types of RA procedures; and
identifying, by the apparatus, the at least one attribute of the UE based on the type of RA procedure used, wherein the at least one attribute of the UE indicates a capability to support a particular version of a wireless communications standard.

26. A method for wireless communication by a user equipment (UE), comprising:
receiving, by the UE, parameters for performing different types of random access (RA) procedures, wherein the different types of RA procedures are selectively performed by the UE based, at least in part, on at least one attribute of the UE, wherein the at least one attribute indicates whether or not the UE is capable of being aware of subframes subject to cooperative partitioning of resources between the BS and one or more non-serving BSs, and wherein the different types of RA procedures comprise:
- a first type of RA procedure to indicate the UE is capable of complying with a first version of a standard; and
- a second type of RA procedure to indicate the UE is capable of complying with a second version of the standard later than the first version; and transmitting, by the UE, one or more RA messages in accordance with the received parameters, wherein the one or more RA messages indicate the at least one attribute of the UE, and wherein the at least one attribute of the UE indicates a capability to support a particular version of a wireless communications standard.

27. The method of claim 26, wherein transmitting the one or more RA messages in accordance with the received parameters comprises:
- transmitting the one or more RA messages using a first physical random access channel (PRACH) sequence, the first PRACH sequence being distinct from a second PRACH sequence used for another RA procedure of the different types of RA procedures.

28. The method of claim 27, wherein the first PRACH sequence and the second PRACH sequence comprise one of: different root sequences or different orthogonal shifts of a same root sequence.

29. The method of claim 26, wherein receiving parameters for performing the different types of RA procedures comprises:
- receiving parameters indicating a first set of frequency locations, the first set of frequency locations being distinct from a second set of frequency locations associated with another RA procedure of the different types of RA procedures.

30. The method of claim 26, wherein receiving parameters for performing the different types of RA procedures comprises:
- receiving parameters indicating a first set of time locations, the first set of time locations being distinct from a second set of time locations associated with another RA procedure of the different types of RA procedures.

31. The method of claim 26, wherein:
the UE comprises a non-legacy UE, and
transmitting the one or more RA messages comprises transmitting an indication the UE is capable of recognizing resource partitioning information (RPI).

32. The method of claim 26, wherein:
transmitting the one or more RA messages comprises transmitting an indication of a detected interference condition.

33. The method of claim 26, wherein transmitting, by the UE, one or more RA messages in accordance with the received parameters includes transmitting on a first set of frequency locations, the first set of frequency locations being distinct from a second set of frequency locations associated with another RA procedure of the different types of RA procedures.

34. The method of claim 26, wherein transmitting, by the UE, one or more RA messages in accordance with the received parameters includes transmitting on a first set of time locations, the first set of time locations being distinct from a second set of time locations associated with another RA procedure of the different types of RA procedures.

35. An apparatus for wireless communication by a user equipment (UE), comprising:
- means for receiving, by the UE, parameters for performing different types of random access (RA) procedures, wherein the different types of RA procedures are selectively performed by the UE based, at least in part, on at least one attribute of the UE, wherein the at least one attribute indicates whether or not the UE is capable of being aware of subframes subject to cooperative partitioning of resources between the BS and one or more non-serving BSs, and wherein the different types of RA procedures comprise:
  - a first type of RA procedure to indicate the UE is capable of complying with a first version of a standard; and
  - a second type of RA procedure to indicate the UE is capable of complying with a second version of the standard later than the first version; and
- means for transmitting, by the UE, one or more RA messages in accordance with the received parameters, wherein the one or more RA messages indicate the at least one attribute of the UE, and wherein the at least one attribute of the UE indicates a capability to support a particular version of a wireless communications standard.

36. An apparatus for wireless communication by a user equipment (UE), comprising:
- at least one processor configured to:
  - receive, by the UE, parameters for performing different types of random access (RA) procedures, wherein the different types of RA procedures are selectively performed by the UE based, at least in part, on at least one attribute of the UE, wherein the at least one attribute indicates whether or not the UE is capable of being aware of subframes subject to cooperative partitioning of resources between the BS and one or more non-serving BSs, and wherein the different types of RA procedures comprise:
    - a first type of RA procedure to indicate the UE is capable of complying with a first version of a standard; and
    - a second type of RA procedure to indicate the UE is capable of complying with a second version of the standard later than the first version; and
  - transmit, by the UE, one or more RA messages in accordance with the received parameters, wherein the one or more RA messages indicate the at least one attribute of the UE, and wherein the at least one attribute of the UE indicates a capability to support a particular version of a wireless communications standard; and
- a memory coupled with the at least one processor.

37. A non-transitory computer readable medium of a user equipment (UE) having instructions stored thereon, the instructions executable by one or more processors for:
- receiving, by the UE, parameters for performing different types of random access (RA) procedures, wherein the different types of RA procedures are selectively performed by the UE based, at least in part, on at least one attribute of the UE, wherein the at least one attribute indicates whether or not the UE is capable of being aware of subframes subject to cooperative partitioning of resources between the BS and one or more non-serving BSs, and wherein the different types of RA procedures comprise:
   a first type of RA procedure to indicate the UE is capable of complying with a first version of a standard; and
   a second type of RA procedure to indicate the UE is capable of complying with a second version of the standard later than the first version; and
transmitting, by the UE, one or more RA messages in accordance with the received parameters, wherein the one or more RA messages indicate the at least one attribute of the UE, and wherein the at least one attribute of the UE indicates a capability to support a particular version of a wireless communications standard.

\* \* \* \* \*